(12) United States Patent
Whiteside

(10) Patent No.: US 12,469,340 B2
(45) Date of Patent: Nov. 11, 2025

(54) PERFORMANCE TESTING FOR AUTONOMOUS VEHICLES

(71) Applicant: Five AI Limited, Cambridge (GB)

(72) Inventor: Iain Whiteside, Cambridge (GB)

(73) Assignee: Five AI Limited, Cambridge (GB)

( * ) Notice: Subject to any disclaimer, the term of this patent is extended or adjusted under 35 U.S.C. 154(b) by 164 days.

(21) Appl. No.: 18/278,872

(22) PCT Filed: Feb. 25, 2022

(86) PCT No.: PCT/EP2022/054868
§ 371 (c)(1),
(2) Date: Aug. 25, 2023

(87) PCT Pub. No.: WO2022/180241
PCT Pub. Date: Sep. 1, 2022

(65) Prior Publication Data
US 2024/0144745 A1    May 2, 2024

(30) Foreign Application Priority Data
Feb. 26, 2021 (GB) ...................................... 2102811

(51) Int. Cl.
G07C 5/08 (2006.01)
(52) U.S. Cl.
CPC ................. *G07C 5/0808* (2013.01)
(58) Field of Classification Search
CPC .. G07C 5/0808; B60W 60/00; G06F 11/3698; G06F 11/3692
See application file for complete search history.

(56) References Cited

U.S. PATENT DOCUMENTS

2020/0225683 A1* 7/2020 Alvarez ................ B60W 50/04

OTHER PUBLICATIONS

International Search Report; PCT/EP2022/054868; Date: Jun. 8, 2022; By: Authorized Officer: Leuridan, Koen.
Berman Bradley, "Autonomous vehicle operation design domain is key to safety", Nov. 22, 2019 (Nov. 22, 2019), URL:https://www.sae.org/news/2019/11/odds-for-av-testing.
Hejase Mohammad et al., "A Methodology for Model-Based Validation of Autonomous Vehicle Systems", 2020 IEEE Intelligent Vehicles Symposium (IV), IEEE, Oct. 19, 2020 (Oct. 19, 2020), pp. 2097-2103.

* cited by examiner

*Primary Examiner* — Michael V Kerrigan
(74) *Attorney, Agent, or Firm* — Andrew J. Tibbetts; Samuel S. Stone; Greenberg Traurig, LLP

(57) ABSTRACT

A method for testing performance of a stack for planning ego vehicle trajectories in real or simulated driving scenarios applying driving rules to the scenario ground truth for evaluating the performance of the stack in the scenario, and providing output indicating whether each driving rule has been complied with; wherein the driving rules include at least one ODD-based response rule, wherein applying the ODD-based response rule includes processing the scenario ground truth over multiple time steps, to determine whether the scenario is within the defined ODD at each time step, and thereby detecting a change in the scenario that takes the scenario outside the defined ODD, and processing the internal state data, to determine whether a state change occurred within the stack, within a time interval, the output for the at least one ODD-based response rule indicating whether the state change occurred within the time interval.

20 Claims, 14 Drawing Sheets

PERFORMANCE TESTING FOR AUTONOMOUS VEHICLES

CROSS-REFERENCE TO RELATED APPLICATIONS

This application is the U.S. National Stage application, pursuant to 35 U.S.C. § 371, of PCT International Patent Application No. PCT/EP2022/054868, filed Feb. 25, 2022, designating the United States and published in English, which claims priority under 35 U.S.C. §§ 119 and 365 to Great Britain Patent Application No. 2102811.3, filed Feb. 26, 2021. The contents of each of the aforementioned applications are incorporated herein by reference in their entirety.

TECHNICAL FIELD

The present disclosure pertains to methods for evaluating the performance of autonomous vehicle (AV) stacks in real or simulated scenarios, and computer programs and systems for implementing the same. Such stacks are capable of autonomously planning ego vehicle trajectories, at least in certain circumstances. Example applications include ADS (Autonomous Driving System) and ADAS (Advanced Driver Assist System) performance testing.

BACKGROUND

There have been major and rapid developments in the field of autonomous vehicles. An autonomous vehicle (AV) is a vehicle which is equipped with sensors and control systems which enable it to operate without a human controlling its behaviour. An autonomous vehicle is equipped with sensors which enable it to perceive its physical environment, such sensors including for example cameras, radar and lidar. Autonomous vehicles are equipped with suitably programmed computers which are capable of processing data received from the sensors and making safe and predictable decisions based on the context which has been perceived by the sensors. An autonomous vehicle may be fully autonomous (in that it is designed to operate with no human supervision or intervention, at least in certain circumstances) or semi-autonomous. Semi-autonomous systems require varying levels of human oversight and intervention, such systems including Advanced Driver Assist Systems and level three Autonomous Driving Systems. There are different facets to testing the behaviour of the sensors and control systems aboard a particular autonomous vehicle, or a type of autonomous vehicle.

Safety is an increasing challenge as the level of autonomy increases. In autonomous driving, the importance of guaranteed safety has been recognized. Guaranteed safety does not necessarily imply zero accidents, but rather means guaranteeing that some minimum level of safety is met in defined circumstances. It is generally assumed this minimum level of safety must significantly exceed that of human drivers for autonomous driving to be viable.

According to Shalev-Shwartz et al. "On a Formal Model of Safe and Scalable Self-driving Cars" (2017), arXiv: 1708.06374 (the RSS Paper), which is incorporated herein by reference in its entirety, human driving is estimated to cause of the order $10^{-6}$ severe accidents per hour. On the assumption that autonomous driving systems will need to reduce this by at least three order of magnitude, the RSS Paper concludes that a minimum safety level of the order of $10^{-9}$ severe accidents per hour needs to be guaranteed, noting that a pure data-driven approach would therefore require vast quantities of driving data to be collected every time a change is made to the software or hardware of the AV system.

The RSS paper provides a model-based approach to guaranteed safety. A rule-based Responsibility-Sensitive Safety (RSS) model is constructed by formalizing a small number of "common sense" driving rules:

"1. Do not hit someone from behind.
2. Do not cut-in recklessly.
3. Right-of-way is given, not taken.
4. Be careful of areas with limited visibility.
5. If you can avoid an accident without causing another one, you must do it."

The RSS model is presented as provably safe, in the sense that, if all agents were to adhere to the rules of the RSS model at all times, no accidents would occur. The aim is to reduce, by several orders of magnitude, the amount of driving data that needs to be collected in order to demonstrate the required safety level.

SUMMARY

A safety model (such as RSS) can be used as a basis for evaluating the quality of trajectories realized by an ego agent in a real or simulated scenario under the control of an autonomous system (stack). The stack is tested by exposing it to different scenarios, and evaluating the resulting ego trajectories for compliance with rules of the safety model (rules-based testing). However, this approach per se does not adequately address considerations relevant to "level 3" and "level 4" driving autonomy.

A "level 5" vehicle is one that can operate entirely autonomously in any circumstances, because it is always guaranteed to meet some minimum level of safety. Such a vehicle would not require manual controls (steering wheel, pedals etc.) at all.

By contrast, level 3 and level 4 vehicles can operate fully autonomously but only within certain defined circumstances (e.g. within geofenced areas). A level 3 vehicle must be equipped to autonomously handle any situation that requires an immediate response (such as emergency braking); however, a change in circumstances may trigger a "transition demand", requiring a driver to take control of the vehicle within some limited timeframe. A level 4 vehicle has similar limitations; however, in the event the driver does not respond within the required timeframe, a level 4 vehicle must also be capable of autonomously implementing a "minimum risk maneuver" (MRM), i.e. some appropriate action(s) to bring the vehicle to safe conditions (e.g. slowing down and parking the vehicle). A level 2 vehicle requires the driver to be ready to intervene at any time, and it is the responsibility of the driver to intervene if the autonomous systems fail to respond properly at any time. With level 2 automation, it is the responsibility of the driver to determine when their intervention is required; for level 3 and level 4, this responsibility shifts to the vehicle's autonomous systems and it is the vehicle that must alert the driver when intervention is required.

The present disclosure provides an extended form of rules-based testing, with a particular focus on level 3 and level 4 stacks.

According to a first aspect of the present disclosure, a computer system for testing the performance of a stack for planning ego vehicle trajectories in real or simulated driving scenarios comprises:

at least a first input configured to receive (i) scenario ground truth and (ii) internal state data of the stack, the scenario ground truth and internal state data generated using the stack to control an ego agent responsive to at least one other agent in the simulated driving scenario;

at least a second input configured to receive a defined operational design domain (ODD);

a test oracle configured to apply one or more driving rules to the scenario ground truth for evaluating the performance of the stack in the scenario, and provide an output for each of the driving rules indicating whether that driving rule has been complied with;

wherein the one or more driving rules include at least one ODD-based response rule, the test oracle configured to apply the ODD-based response rule by:

processing the scenario ground truth over multiple time steps, to determine whether or not the scenario is within the defined ODD at each time step, and thereby detecting a change in the scenario that takes the scenario outside of the defined ODD, and processing the internal state data, to determine whether a required state change occurred within the stack, within a required time interval, the output for the at least one ODD-based response rule indicating whether or not the required state change occurred within the required time interval.

For example, the required state change may be a transition demand or MRM. The ODD precisely defines the subset of possible circumstances in which the stack is required to perform autonomously, in a way that can be mapped onto the scenario ground truth. It is necessary, but not sufficient, for the stack to perform to some guaranteed minimum level of safety across the entire ODD; the stack must additionally respond correctly in circumstances outside of its ODD, for example by triggering a transition demand, MRM and/or some other required action within the required time interval. Compliance with the latter is determined based on the internal state data of the stack under testing, to determine whether the internal state data exhibits the required state change.

For example, there might be a scenario in which the stack fails to detect that it is now operating outside of its defined ODD (or fails to do so sufficiently quickly). In that particular scenario, the failure may or may not result in an ego trajectory that is unsafe (according to the rules some safety model), but the failure to correctly identify a change in the scenario that takes the scenario outside of the ODD is nevertheless inherently unsafe.

In embodiments, the ODD may be defined in an ODD specification and the computer system may comprise a rule editor configured to interpret the ODD specification, in order to implement the defined ODD in the test oracle.

This allows a user to define (and modify) a bespoke ODD for the stack under testing. The user's bespoke ODD is automatically implemented in the test oracle to ascertain whether the stack is responding as expected when it encounters situations outside of the bespoke ODD.

The ODD may be encoded in the test oracle as a computational graph of atomic operators and numerical thresholds, and the test oracle may be configured to determine whether the scenario is within the ODD by evaluating the computational graph at each time step.

The rule editor may be configured to construct the computational graph according to the ODD specification.

The rule editor may be configured to receive a modified ODD specification, and apply the ODD-based response rule for:

the ODD specification, by evaluating first and second subsets of the computational graph, and the modified ODD specification, by re-evaluating the first subset of the computational graph, without re-evaluating the second subset of the graph, the second subset of the graph unaffected by the modification, the first subset of the graph including at least one node modified based on the modified ODD specification.

The rule editor may be configured to receive a modified ODD specification, modify a first subset of the computational graph to implement the modified ODD specification, without modifying a second subset of the graph common to the ODD specification and the modified ODD specification.

The test oracle may be configured to apply the ODD-based response rule for:

the ODD specification, by evaluating the first and second subsets of the computational graph, and the modified ODD specification, by evaluating the modified first second subset of the computational graph, without re-evaluating the second subset of the graph.

The rule editor may be configured to interpret the (or each) ODD specification based on an ontology that maps ODD concepts to corresponding numerical variable ranges of the scenario, by:

identifying ODD concepts in the (or each) ODD, determining, from the ontology, corresponding numerical ranges, setting the thresholds of the computational graph to implement the corresponding numerical ranges.

The rule editor may be configured to modify the first subset of the computational graph by:

detecting a modified ODD concept in the modified ODD specification, determining, from the ontology, a numerical range corresponding to the modified ODD concept, and modify at least one of the thresholds of the computational graph to implement the numerical range corresponding to the modified ODD concept.

The at least one ODD-based response rule may comprise a transition demand rule, and the test oracle may be configured to evaluate the transition demand rule by processing the internal state data to determine whether or not a transition demand occurred within a required transition demand interval of the change in the scenario.

The at least one ODD-based response rule may comprise a minimum risk maneuver (MRM) rule, and the test oracle may be configured to evaluate the MRM rule by processing the internal state data to determine whether or not a minimum risk maneuver was instigated within a required MRM interval.

The required MRM interval may be measured from the transition demand.

The driving rules may additionally include one or more trajectory evaluation rules, and the test oracle may be configured to apply the trajectory evaluation rules, independently of the internal state data, based on a realized trajectory of the ego agent in the scenario.

The trajectory evaluation rules may pertain to safety, progress, comfort or any combination thereof.

The output for the MRM rule may indicate whether or not the minimum risk maneuver was instigated within the stack, within the required MRM interval, and, in the event the minimum risk maneuver is instigated, the output(s) of the trajectory evaluation rules may pertain to a portion of the realized trajectory caused by the instigation of the minimum risk maneuver.

The rule editor may be configured to interpret the ODD specification according to a formal ontology language.

The ODD-based response rule may be encoded in temporal logic within the test oracle.

The stack may be configured to make an online determination as to whether or not it is operating within the defined ODD, based on the same ODD specification, the internal state data of the stack dependent thereon.

A second aspect herein provides a computer program for testing the performance of a stack for planning ego for planning ego vehicle trajectories in real or simulated driving scenarios, the computer program embodying:

a test oracle configured to apply one or more driving rules to scenario ground truth for evaluating the performance of the stack in the scenario, and provide an output for each of one or more driving rules indicating whether that driving rule has been complied with;

wherein the one or more driving rules include at least one ODD-based response rule, the test oracle configured to apply the ODD-based response rule by:

processing the scenario ground truth over multiple time steps, to determine whether or not the scenario is within a defined operational design domain (ODD) at each time step, and thereby detecting a change in the scenario that takes the scenario outside of the defined ODD, and processing internal state data of the stack, to determine whether required state change occurred within the stack, within a required time interval, the output for the at least one ODD-based response rule indicating whether or not the required state change occurred within the required time interval.

A third aspect herein provides a computer-implemented method of testing the performance of a stack for planning ego vehicle trajectories in real or simulated driving scenarios, the method comprising:

receiving (i) scenario ground truth and (ii) internal state data of the stack, the scenario ground truth and internal state data generated using the stack to control an ego agent responsive to at least one other agent in the simulated driving scenario;

receiving a defined operational design domain (ODD);

applying one or more driving rules to the scenario ground truth for evaluating the performance of the stack in the scenario, and providing an output for each of the driving rules indicating whether that driving rule has been complied with;

wherein the one or more driving rules include at least one ODD-based response rule, the ODD-based response rule applied by:

processing the scenario ground truth over multiple time steps, to determine whether or not the scenario is within the defined ODD at each time step, and thereby detecting a change in the scenario that takes the scenario outside of the defined ODD, and processing the internal state data, to determine whether a required state change occurred within the stack, within a required time interval, the output for the at least one ODD-based response rule indicating whether or not the required state change occurred within the required time interval.

In embodiments of the first and second aspects, any feature of the first aspect or any embodiment thereof may be implemented.

A fourth aspect herein provides a computer system for testing the performance of a stack for planning ego vehicle trajectories in real or simulated driving scenarios, the computer system comprising: at least a first input configured to receive (i) scenario ground truth and (ii) internal state data of the stack, the scenario ground truth and internal state data generated using the stack to control an ego agent responsive to at least one other agent in the simulated driving scenario; at least a second input configured to receive a driving specification; a test oracle configured to apply one or more driving rules to the scenario ground truth for evaluating the performance of the stack in the scenario, and provide an output for each of the driving rules indicating whether that driving rule has been complied with. The one or more driving rules include at least one specification-based response rule, the test oracle configured to apply the specification-based response rule by: processing the scenario ground truth over multiple time steps, and thereby detecting a change in the scenario that requires a response in the form of a required state change within the stack, and processing the internal state data, to determine whether the required state change occurred within the stack, within a required time interval, the output for the at least one specification-based response rule indicating whether or not the required state change occurred within the required time interval.

Examples of required events include one or more of emergency braking, emergency maneuver, minimal risk maneuver, transition demand, etc. Other examples include emergency braking and forward collision warning events (state changes).

For example, the driving specification might require that a warning signal is triggered some set time interval T before a braking demand, and the test oracle may check for 'warning active' and 'braking demand' events in the internal state data of the stack. A specification-based driving rule for the warning active may be coded as 'did the warning active event trigger more than T seconds before the braking demand event?'.

One example context is automated lane keeping, where the driving specification might specify a set of automated lane keeping requirements (including one or more required actions that are detectable as changes in the internal state of the stack).

In embodiments, the computer system may comprise a rule editor configured to interpret the driving specification, in order to implement the defined driving specification in the test oracle.

This allows a user to define (and modify) a bespoke driving specification for the stack under testing.

The driving specification may be encoded in the test oracle as a computational graph of atomic operators and numerical thresholds, and the test oracle may be configured to determine whether the response is required by evaluating the computational graph at each time step.

The rule editor may be configured to construct the computational graph according to the driving specification.

The rule editor may be configured to receive a modified driving specification, and apply the specification-based response rule for:

the driving specification, by evaluating first and second subsets of the computational graph, and the modified driving specification, by re-evaluating the first subset of the computational graph, without re-evaluating the second subset of the graph, the second subset of the graph unaffected by the modification, the first subset of the graph including at least one node modified based on the modified driving specification.

The rule editor may be configured to receive a modified driving specification, modify a first subset of the computational graph to implement the modified driving specification, without modifying a second subset of the graph common to the driving specification and the modified driving specification.

The test oracle may be configured to apply the specification-based response rule for:
  the driving specification, by evaluating the first and second subsets of the computational graph, and
  the modified driving specification, by evaluating the modified first second subset of the computational graph, without re-evaluating the second subset of the graph.

The driving rules may additionally include one or more trajectory evaluation rules, and the test oracle may be configured to apply the trajectory evaluation rules, independently of the internal state data, based on a realized trajectory of the ego agent in the scenario.

The trajectory evaluation rules may pertain to safety, progress, comfort or any combination thereof.

Further aspects herein provide a method carried out in the above computer system, and computer program code for implementing the same.

BRIEF DESCRIPTION OF FIGURES

For a better understanding of the present disclosure, and to show how embodiments of the same may be carried into effect, reference is made by way of example only to the following figures in which.

Figure 6:
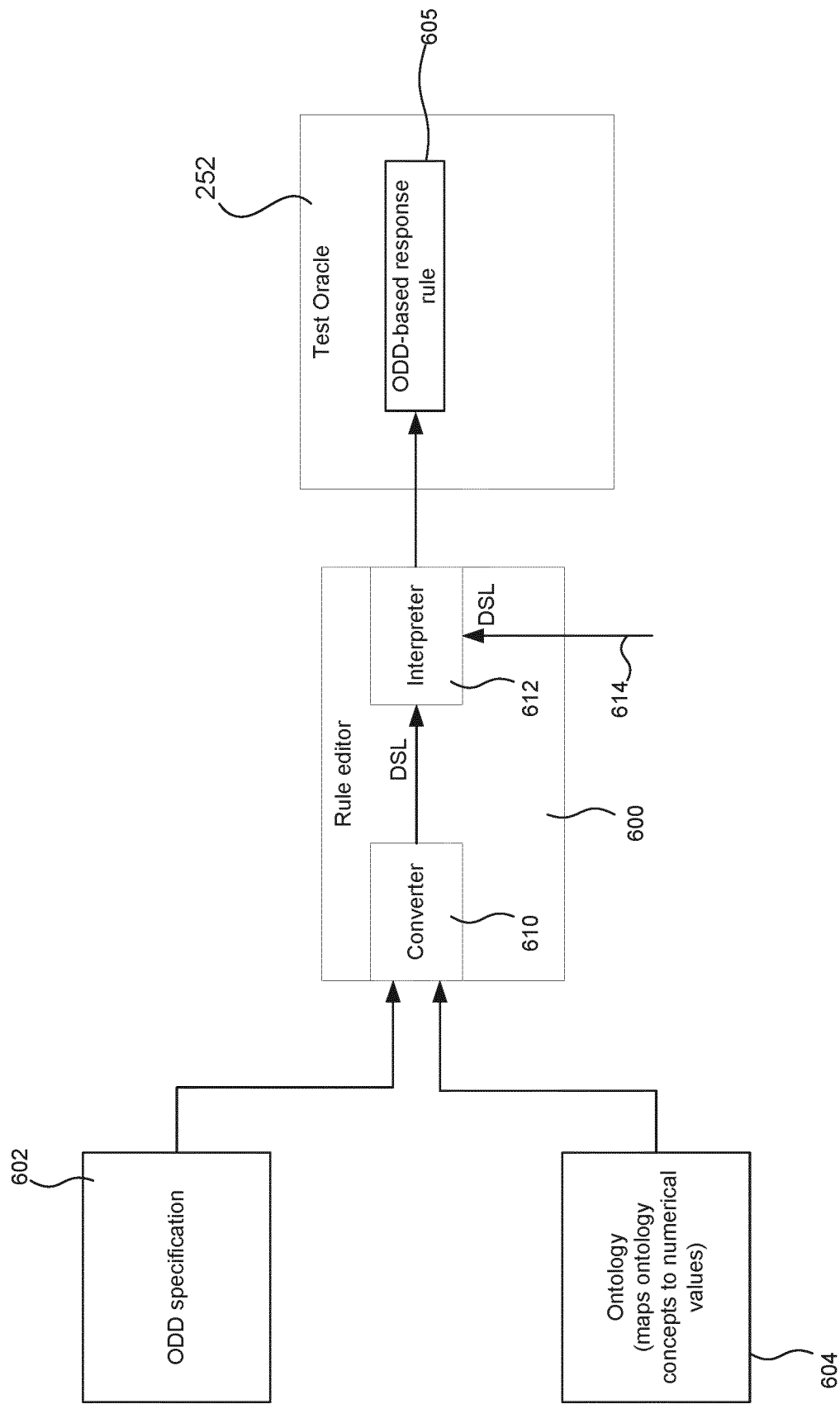
Figure 7:
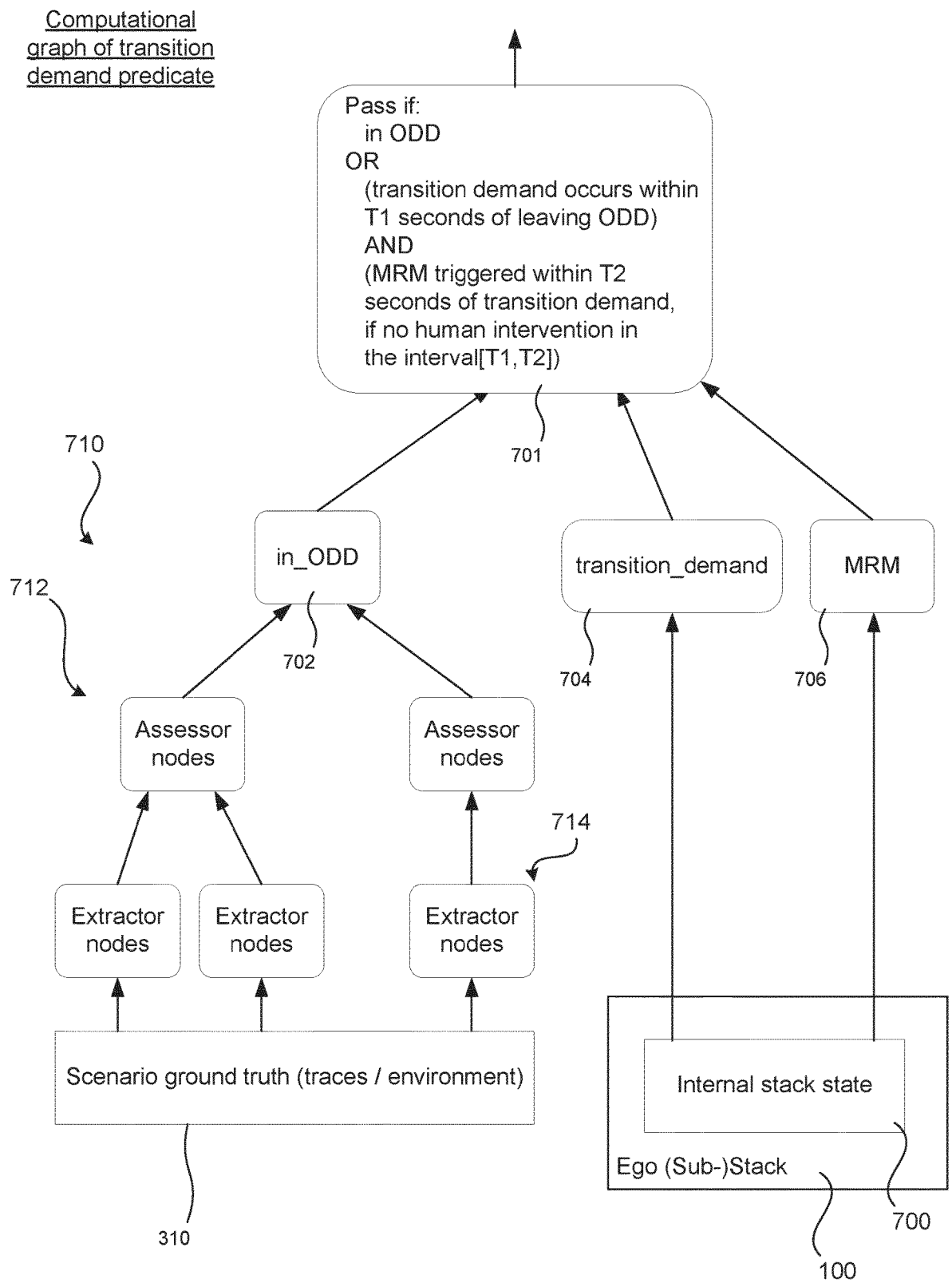
Figure 8A:
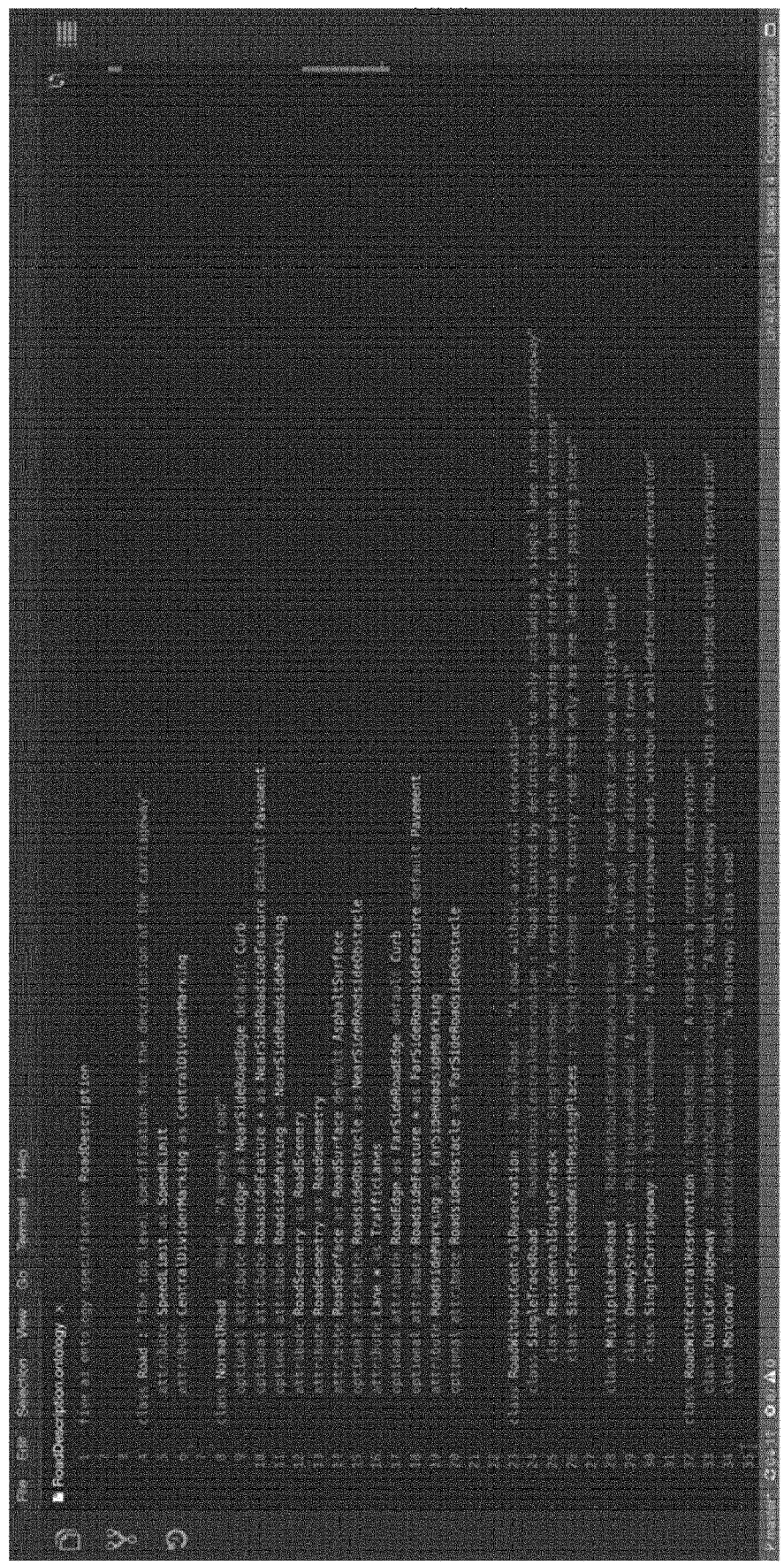
Figure 8B:
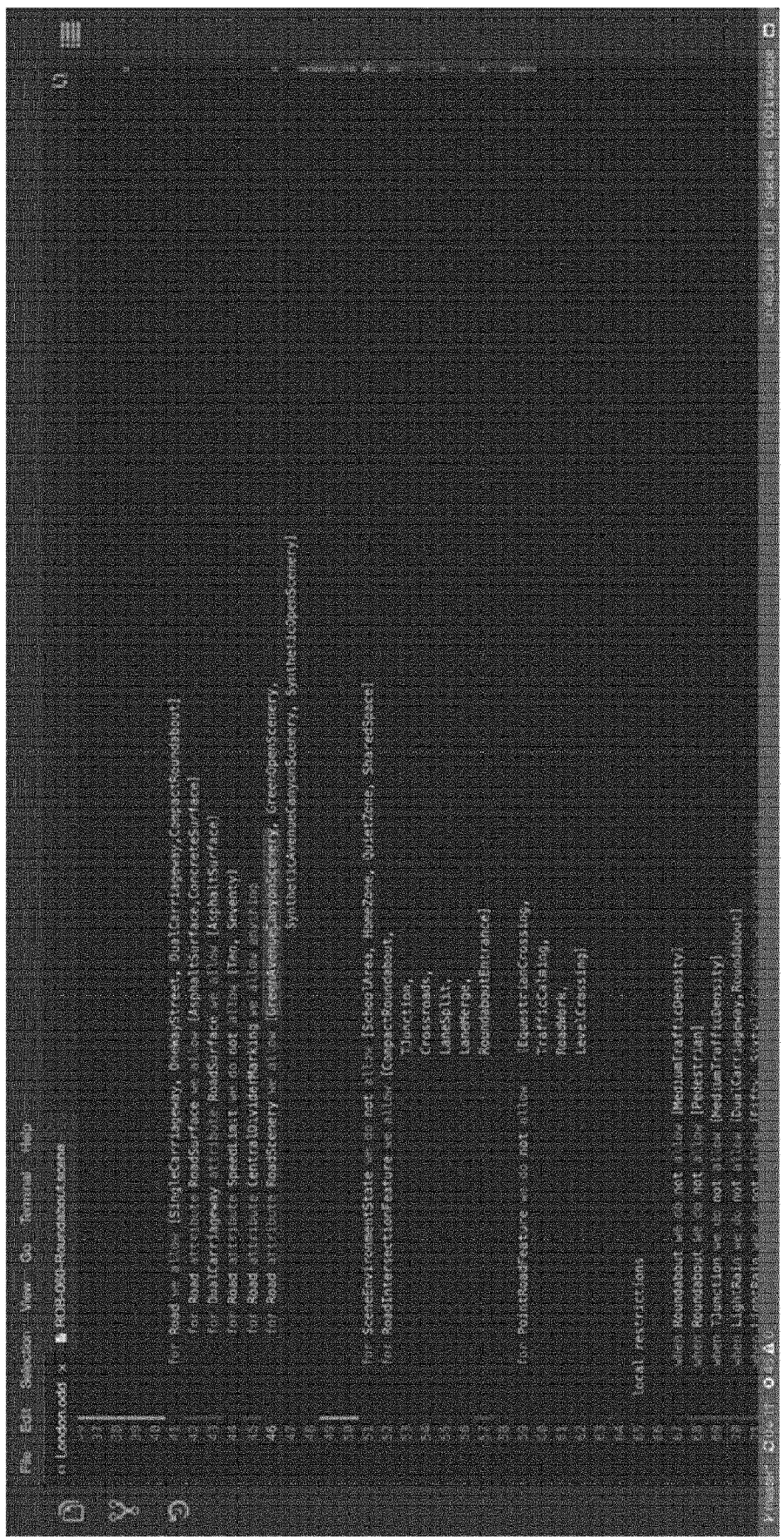

FIG. shows an example graphical user interface (GUI) on which collapsible output graphs are displayed;

FIG. 6 shows a schematic block diagram of an enhanced rule editor for constructing rules based on an operational design domain (ODD) specification;

FIG. 7 shows an example ODD-based response rule implemented as a computational graph;

FIG. 8A shows an ontology editing interface;

FIG. 8B shows an ODD editing interface; and

Figure 9:
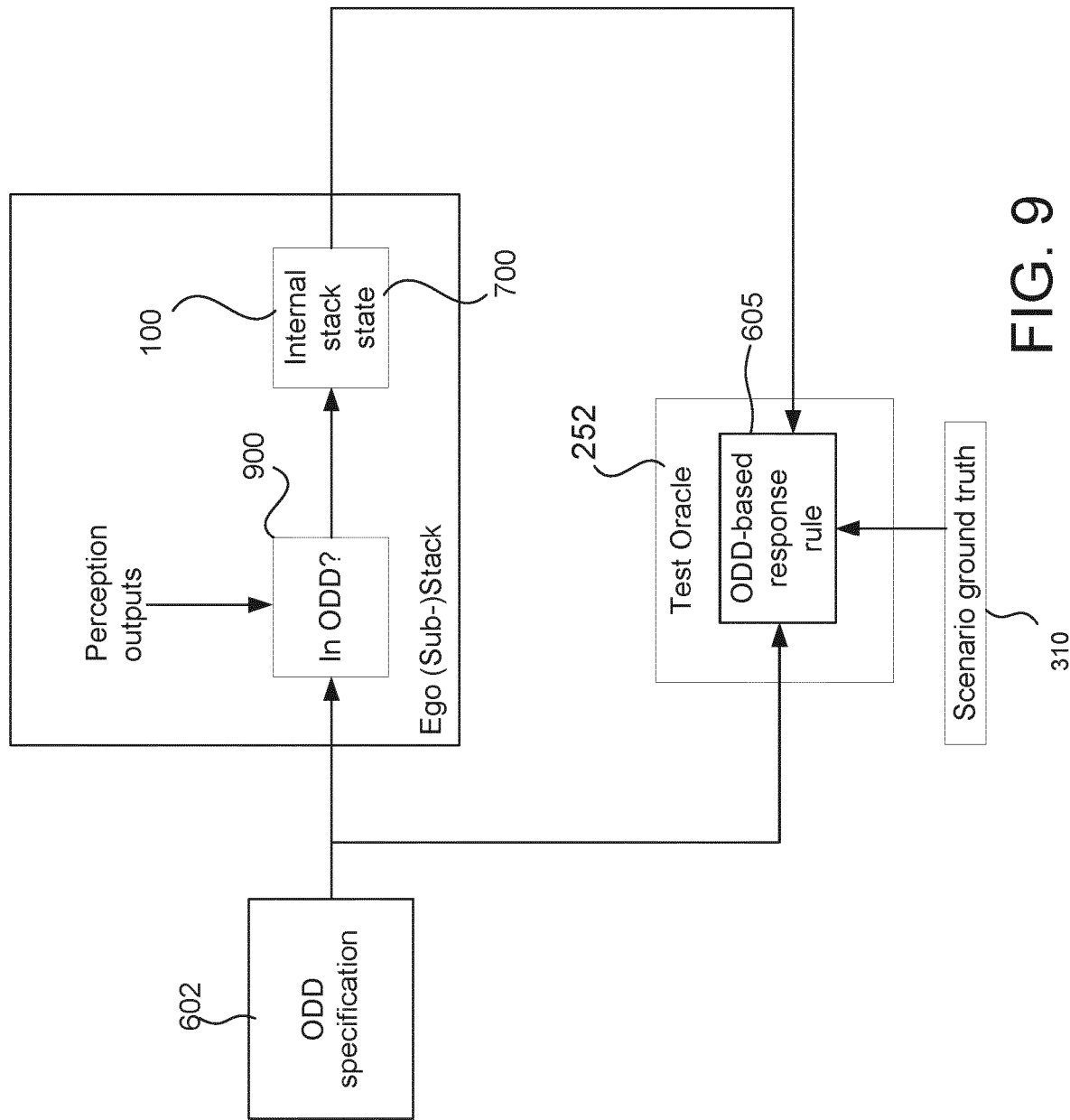

FIG. 9 shows a schematic block diagram of a stack configured to make an online assessment of whether or not it is operating with a defined ODD.

DETAILED DESCRIPTION

The described embodiments provide a testing pipeline to facilitate rules-based testing of AV stacks. A rule editor allows custom rules to be defined and evaluated against trajectories realized in real or simulated scenarios. Such rules may evaluate different facets of safety, but also other factors such as comfort and progress towards some defined goal.

An extended testing framework also allows rules to be defined in relation to internal stack data. in the following examples, such rules are evaluated, at least in part, based on a driving specification in the form of a custom ODD specification that precisely defines an ODD of the stack under testing. Within this extended framework, one or more rules can be constructed to evaluate whether the stack has exhibited some required response (such as a transition demand or MRM) to a change that takes a scenario outside of the ODD (e.g. a change in weather, lighting conditions, road conditions etc., or the ego agent moving outside of some geofenced area, or any other factor or combination of factors that take the scenario outside of the ODD).

Herein, a "scenario" can be real or simulated and involves an ego agent (ego vehicle) moving within an environment (e.g. within a particular road layout), typically in the presence of one or more other agents (other vehicles, pedestrians, cyclists, animals etc.). A "trace" is a history of an agent's (or actor's) location and motion over the course of a scenario. There are many ways a trace can be represented. Trace data will typically include spatial and motion data of an agent within the environment. The term is used in relation to both real scenarios (with physical traces) and simulated scenarios (with simulated traces). The following description considers simulated scenarios but the same techniques can be applied to assess performance on real-world scenarios.

In a simulation context, the term scenario may be used in relation to both the input to a simulator (such as an abstract scenario description) and the output of the simulator (such as the traces). It will be clear in context which is referred to.

A typical AV stack includes perception, prediction, planning and control (sub)systems. The term "planning" is used herein to refer to autonomous decision-making capability (such as trajectory planning) whilst "control" is used to refer to the generation of control signals for carrying out autonomous decisions. The extent to which planning and control are integrated or separable can vary significantly between different stack implementations—in some stacks, these may be so tightly coupled as to be indistinguishable (e.g. such stacks could plan in terms of control signals directly), whereas other stacks may be architected in a way that draws a clear distinction between the two (e.g. with planning in terms of trajectories, and with separate control optimizations to determine how best to execute a planned trajectory at the control signal level). Unless otherwise indicated, the planning and control terminology used herein does not imply any particular coupling or separation of those aspects. An example form of AV stack will now be described in further detail, to provide relevant context to the subsequent description.

Figure 1A:
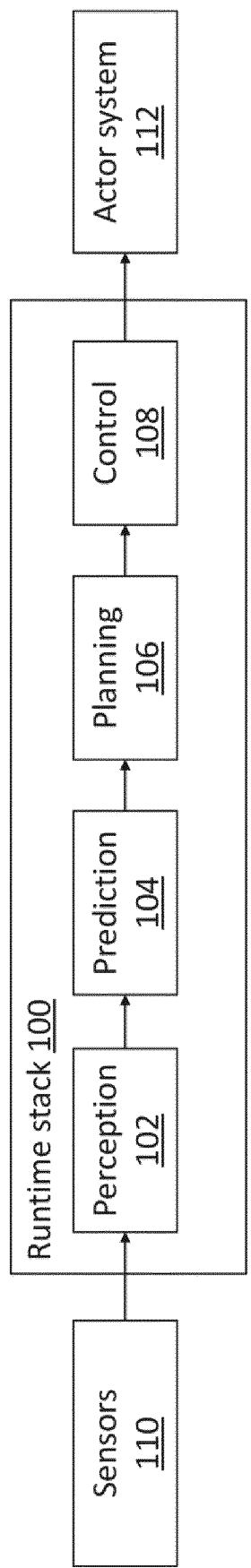
FIG. 1A shows a schematic function block diagram of an autonomous vehicle stack.

FIG. 1A shows a highly schematic block diagram of a runtime stack 100 for an autonomous vehicle (AV), also referred to herein as an ego vehicle (EV). The run time stack 100 is shown to comprise a perception system 102, a prediction system 104, a planner 106 and a controller 108.

In a real-world context, the perception system 102 would receive sensor outputs from an on-board sensor system 110 of the AV, and use those sensor outputs to detect external agents and measure their physical state, such as their position, velocity, acceleration etc. The on-board sensor system 110 can take different forms but generally comprises a variety of sensors such as image capture devices (cameras/optical sensors), lidar and/or radar unit(s), satellite-positioning sensor(s) (GPS etc.), motion/inertial sensor(s) (accelerometers, gyroscopes etc.) etc. The onboard sensor system 110 thus provides rich sensor data from which it is possible to extract detailed information about the surrounding environment, and the state of the AV and any external actors (vehicles, pedestrians, cyclists etc.) within that environment. The sensor outputs typically comprise sensor data of multiple sensor modalities such as stereo images from one or more stereo optical sensors, lidar, radar etc. Sensor data of multiple sensor modalities may be combined using filters, fusion components etc.

The perception system 102 typically comprises multiple perception components which co-operate to interpret the sensor outputs and thereby provide perception outputs to the prediction system 104.

In a simulation context, depending on the nature of the testing—and depending, in particular, on where the stack 100 is "sliced" for the purpose of testing—it may or may not be necessary to model the on-board sensor system 100. With higher-level slicing, simulated sensor data is not required therefore complex sensor modelling is not required.

The perception outputs from the perception system 102 are used by the prediction system 104 to predict future behaviour of external actors (agents), such as other vehicles in the vicinity of the AV.

Predictions computed by the prediction system 104 are provided to the planner 106, which uses the predictions to make autonomous driving decisions to be executed by the AV in a given driving scenario. The inputs received by the planner 106 would typically indicate a drivable area and would also capture predicted movements of any external agents (obstacles, from the AV's perspective) within the drivable area. The driveable area can be determined using perception outputs from the perception system 102 in combination with map information, such as an HD (high definition) map.

A core function of the planner 106 is the planning of trajectories for the AV (ego trajectories), taking into account predicted agent motion. This may be referred to as trajectory planning. A trajectory is planned in order to carry out a desired goal within a scenario. The goal could for example be to enter a roundabout and leave it at a desired exit; to overtake a vehicle in front; or to stay in a current lane at a target speed (lane following). The goal may, for example, be determined by an autonomous route planner (not shown).

The controller 108 executes the decisions taken by the planner 106 by providing suitable control signals to an on-board actor system 112 of the AV. In particular, the planner 106 plans trajectories for the AV and the controller 108 generates control signals to implement the planned trajectories. Typically, the planner 106 will plan into the future, such that a planned trajectory may only be partially implemented at the control level before a new trajectory is planned by the planner 106.

Simulation Context

Figure 2:
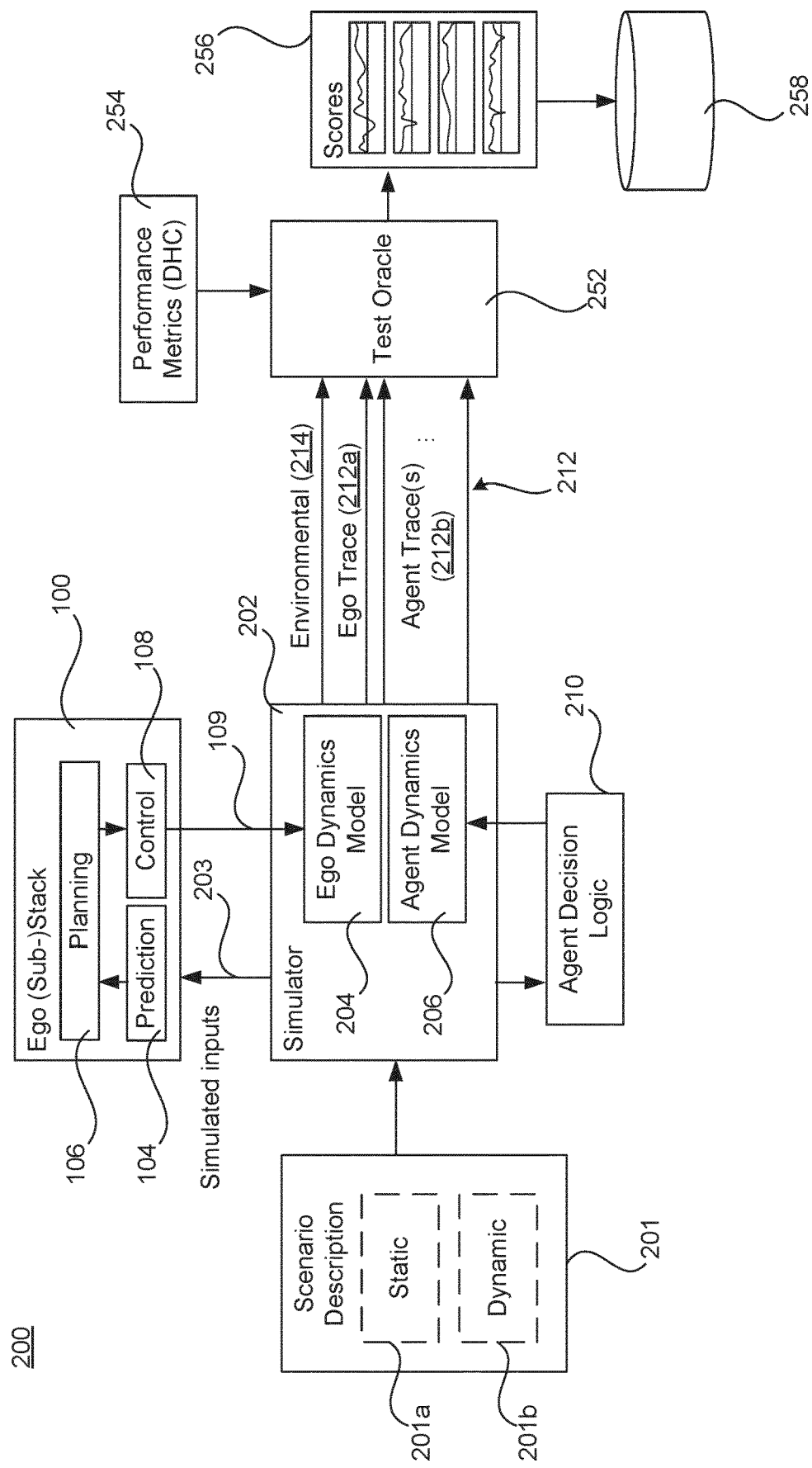
FIG. 2 shows a schematic block diagram of a testing pipeline.

FIG. 2 shows a schematic block diagram of a testing pipeline 200. The testing pipeline 200 is shown to comprise a simulator 202 and a test oracle 252. The simulator 202 runs simulated scenarios for the purpose of testing all or part of an AV run time stack, and the test oracle 253 evaluates the performance of the stack (or sub-stack) on the simulated scenarios. The following description refers to the stack of FIG. 1A by way of example. However, the testing pipeline 200 is highly flexible and can be applied to any stack or sub-stack operating at any level of autonomy.

The idea of simulation-based testing is to run a simulated driving scenario that an ego agent must navigate under the control of a stack (or sub-stack) being tested. Typically, the scenario includes a static drivable area (e.g. a particular static road layout) that the ego agent is required to navigate in the presence of one or more other dynamic agents (such as other vehicles, bicycles, pedestrians etc.). Simulated inputs feed into the stack under testing, where they are used to make decisions. The ego agent is, in turn, caused to carry out those decisions, thereby simulating the behaviour of an autonomous vehicle in those circumstances.

Simulated inputs 203 are provided to the stack under testing. "Slicing" refers to the selection of a set or subset of stack components for testing. This, in turn, dictates the form of the simulated inputs 203.

By way of example, FIG. 2 shows the prediction, planning and control systems 104, 106 and 108 within the AV stack 100 being tested. To test the full AV stack of FIG. 1A, the perception system 104 could also be applied during testing. In this case, the simulated inputs 203 would comprise synthetic sensor data that is generated using appropriate sensor model(s) and processed within the perception system 102 in the same way as real sensor data. This requires the generation of sufficiently realistic synthetic sensor inputs (such as photorealistic image data and/or equally realistic simulated lidar/radar data etc.). The resulting outputs of the perception system 102 would, in turn, feed into the higher-level prediction and planning systems 104, 106.

By contrast, so-called "planning-level" simulation would essentially bypass the perception system 102. The simulator 202 would instead provide simpler, higher-level inputs 203 directly to the prediction system 104. In some contexts, it may even be appropriate to bypass the prediction system 104 as well, in order to test the planner 106 on predictions obtained directly from the simulated scenario.

Between these extremes, there is scope for many different levels of input slicing, e.g. testing only a subset of the perception system, such as "later" perception components, i.e., components such as filters or fusion components which operate on the outputs from lower-level perception components (such as object detectors, bounding box detectors, motion detectors etc.).

By way of example only, the description of the testing pipeline 200 makes reference to the runtime stack 100 of FIG. 1A. As discussed, it may be that only a sub-stack of the run-time stack is tested, but for simplicity, the following description refers to the AV stack 100 throughout. In FIG. 2, reference numeral 100 can therefore denote a full AV stack or only sub-stack depending on the context. For the avoidance of doubt, the term stack may be used in relation to a full stack 100 of the kind shown in FIG. 1A, but also a more limited sub-stack (such as the planner 106) in isolation.

Whatever form they take, the simulated inputs 203 are used (directly or indirectly) as a basis for decision-making by the planner 108.

The controller 108, in turn, implements the planner's decisions by outputting control signals 109. In a real-world context, these control signals would drive the physical actor system 112 of AV. In simulation, an ego vehicle dynamics model 204 is used to translate the resulting control signals 109 into realistic motion of the ego agent within the simulation, thereby simulating the physical response of an autonomous vehicle to the control signals 109.

Alternatively, a simpler form of simulation assumes that the ego agent follows each planned trajectory exactly. This approach bypasses the control system 108 (to the extent it is separable from planning) and removes the need for the ego vehicle dynamic model 204. This may be sufficient for testing certain facets of planning.

To the extent that external agents exhibit autonomous behaviour/decision making within the simulator 202, some form of agent decision logic 210 is implemented to carry out those decisions and determine agent behaviour within the scenario. The agent decision logic 210 may be comparable in complexity to the ego stack 100 itself or it may have a more limited decision-making capability. The aim is to provide sufficiently realistic external agent behaviour within the simulator 202 to be able to usefully test the decision-making capabilities of the ego stack 100. In some contexts, this does not require any agent decision making logic 210 at all (open-loop simulation), and in other contexts useful testing can be provided using relatively limited agent logic 210 such as basic adaptive cruise control (ACC). One or more agent dynamics models 206 may be used to provide more realistic agent behaviour.

A simulation of a driving scenario is run in accordance with a scenario description 201, having both static and dynamic layers 201a, 201b.

The static layer 201a defines static elements of a scenario, which would typically include a static road layout.

The dynamic layer 201b defines dynamic information about external agents within the scenario, such as other vehicles, pedestrians, bicycles etc. The extent of the dynamic information provided can vary. For example, the dynamic layer 201b may comprise, for each external agent, a spatial path to be followed by the agent together with one or both of motion data and behaviour data associated with the path. In simple open-loop simulation, an external actor simply follows the spatial path and motion data defined in the dynamic layer that is non-reactive i.e. does not react to the ego agent within the simulation. Such open-loop simulation can be implemented without any agent decision logic 210. However, in closed-loop simulation, the dynamic layer 201b instead defines at least one behaviour to be followed along a static path (such as an ACC behaviour). In this case, the agent decision logic 210 implements that behaviour within the simulation in a reactive manner, i.e. reactive to the ego agent and/or other external agent(s). Motion data may still be associated with the static path but in this case is less prescriptive and may for example serve as a target along the path. For example, with an ACC behaviour, target speeds may be set along the path which the agent will seek to match, but the agent decision logic 110 might be permitted to reduce the speed of the external agent below the target at any point along the path in order to maintain a target headway from a forward vehicle.

The output of the simulator 202 for a given simulation includes an ego trace 212a of the ego agent and one or more agent traces 212b of the one or more external agents (traces 212).

A trace is a complete history of an agent's behaviour within a simulation having both spatial and motion components. For example, a trace may take the form of a spatial path having motion data associated with points along the path such as speed, acceleration, jerk (rate of change of acceleration), snap (rate of change of jerk) etc.

Additional information is also provided to supplement and provide context to the traces 212. Such additional information is referred to as "environmental" data 214 which can have both static components (such as road layout) and dynamic components (such as weather conditions to the extent they vary over the course of the simulation). To an extent, the environmental data 214 may be "passthrough" in that it is directly defined by the scenario description 201 and is unaffected by the outcome of the simulation. For example, the environmental data 214 may include a static road layout that comes from the scenario description 201 directly. However, typically the environmental data 214 would include at least some elements derived within the simulator 202. This could, for example, include simulated weather data, where the simulator 202 is free to change weather conditions as the simulation progresses. In that case, the weather data may be time-dependent, and that time dependency will be reflected in the environmental data 214.

The test oracle 252 receives the traces 212 and the environmental data 214, and scores those outputs in the manner described below. The scoring is time-based: for each performance metric, the test oracle 252 tracks how the value of that metric (the score) changes over time as the simulation progresses. The test oracle 252 provides an output 256 comprising a score-time plot for each performance metric, as described in further detail later. The metrics 254 are informative to an expert and the scores can be used to identify and mitigate performance issues within the tested stack 100. The output 256 of the test oracle 252 is stored in a test database 258.

Perception Error Models

Figure 2A:
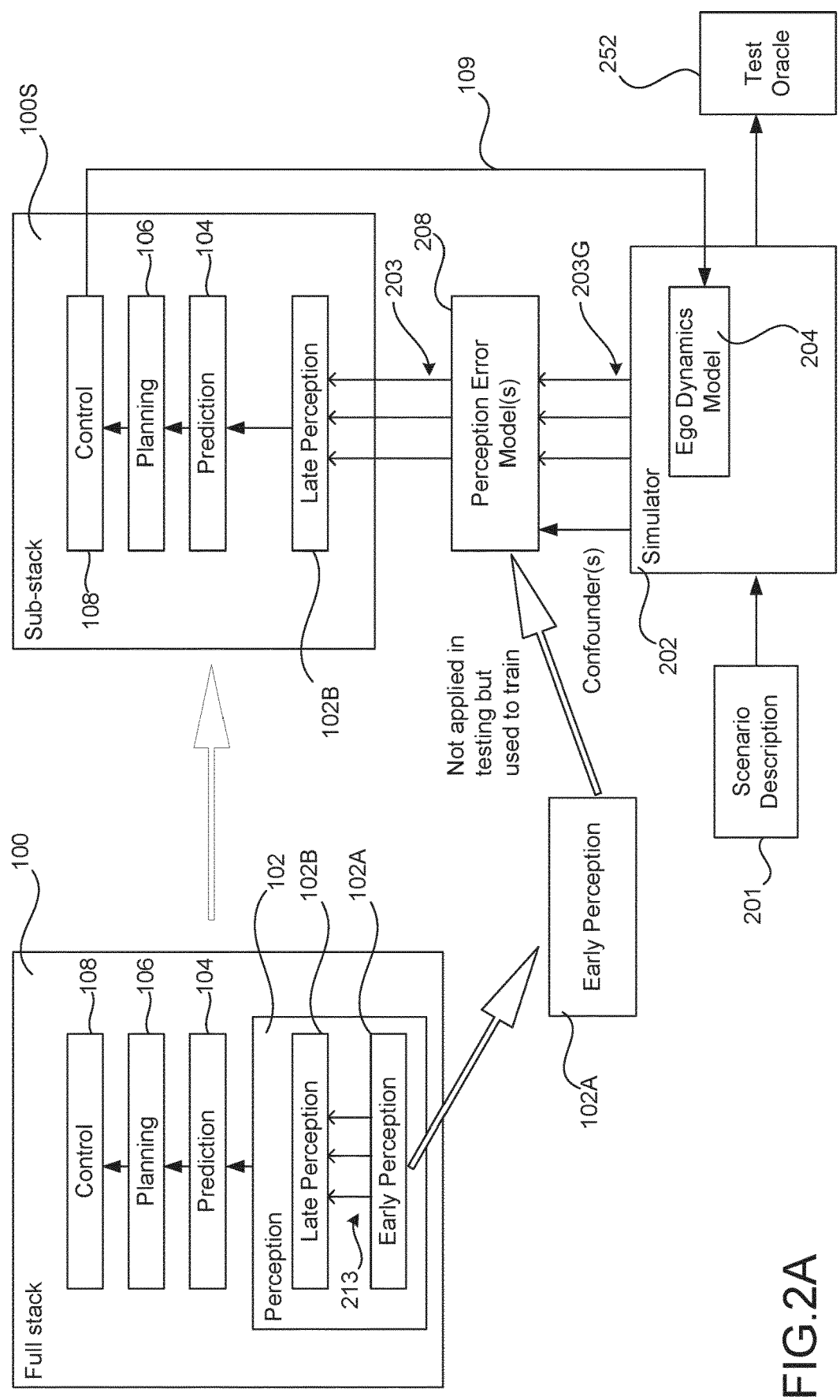
FIG. 2A shows further details of a possible implementation of the testing pipeline.

FIG. 2A illustrates a particular form of slicing and uses reference numerals 100 and 100S to denote a full stack and sub-stack respectively. It is the sub-stack 100S that would be subject to testing within the testing pipeline 200 of FIG. 2.

A number of "later" perception components 102B form part of the sub-stack 100S to be tested and are applied, during testing, to simulated perception inputs 203. The later perception components 102B could, for example, include filtering or other fusion components that fuse perception inputs from multiple earlier perception components.

In the full stack 100, the later perception component 102B would receive actual perception inputs 213 from earlier perception components 102A. For example, the earlier perception components 102A might comprise one or more 2D or 3D bounding box detectors, in which case the simulated perception inputs provided to the late perception components could include simulated 2D or 3D bounding box detections, derived in the simulation via ray tracing. The earlier perception components 102A would generally include component(s) that operate directly on sensor data.

With this slicing, the simulated perception inputs 203 would correspond in form to the actual perception inputs 213 that would normally be provided by the earlier perception components 102A. However, the earlier perception components 102A are not applied as part of the testing, but are instead used to train one or more perception error models 208 that can be used to introduce realistic error, in a statistically rigorous manner, into the simulated perception inputs 203 that are fed to the later perception components 102B of the sub-stack 100 under testing.

Such perception error models may be referred to as Perception Statistical Performance Models (PSPMs) or, synonymously, "PRISMs". Further details of the principles of PSPMs, and suitable techniques for building and training them, may be bound in International Patent Application Nos. PCT/EP2020/073565, PCT/EP2020/073562, PCT/EP2020/073568, PCT/EP2020/073563, and PCT/EP2020/073569, each of which is incorporated herein by reference in its entirety. The idea behind PSPMs is to efficiently introduce realistic errors into the simulated perception inputs provided to the sub-stack 100S (i.e. that reflect the kind of errors that would be expected were the earlier perception components 102A to be applied in the real-world). In a simulation context, "perfect" ground truth perception inputs 203G are provided by the simulator, but these are used to derive more realistic perception inputs 203 with realistic error introduced by the perception error models(s) 208.

As described in the aforementioned reference, a PSPM can be dependent on one or more variables representing physical condition(s) ("confounders"), allowing different levels of error to be introduced that reflect different possible real-world conditions. Hence, the simulator 202 can simulate different physical conditions (e.g. different weather conditions) by simply changing the value of a weather confounder(s), which will, in turn, change how perception error is introduced.

The later perception components 102b within the sub-stack 100S process the simulated perception inputs 203 in exactly the same way as they would process the real-world perception inputs 213 within the full stack 100, and their outputs, in turn, drive prediction, planning and control. Alternatively, PSPMs can be used to model the entire perception system 102, including the late perception components 208.

Figure 1B:
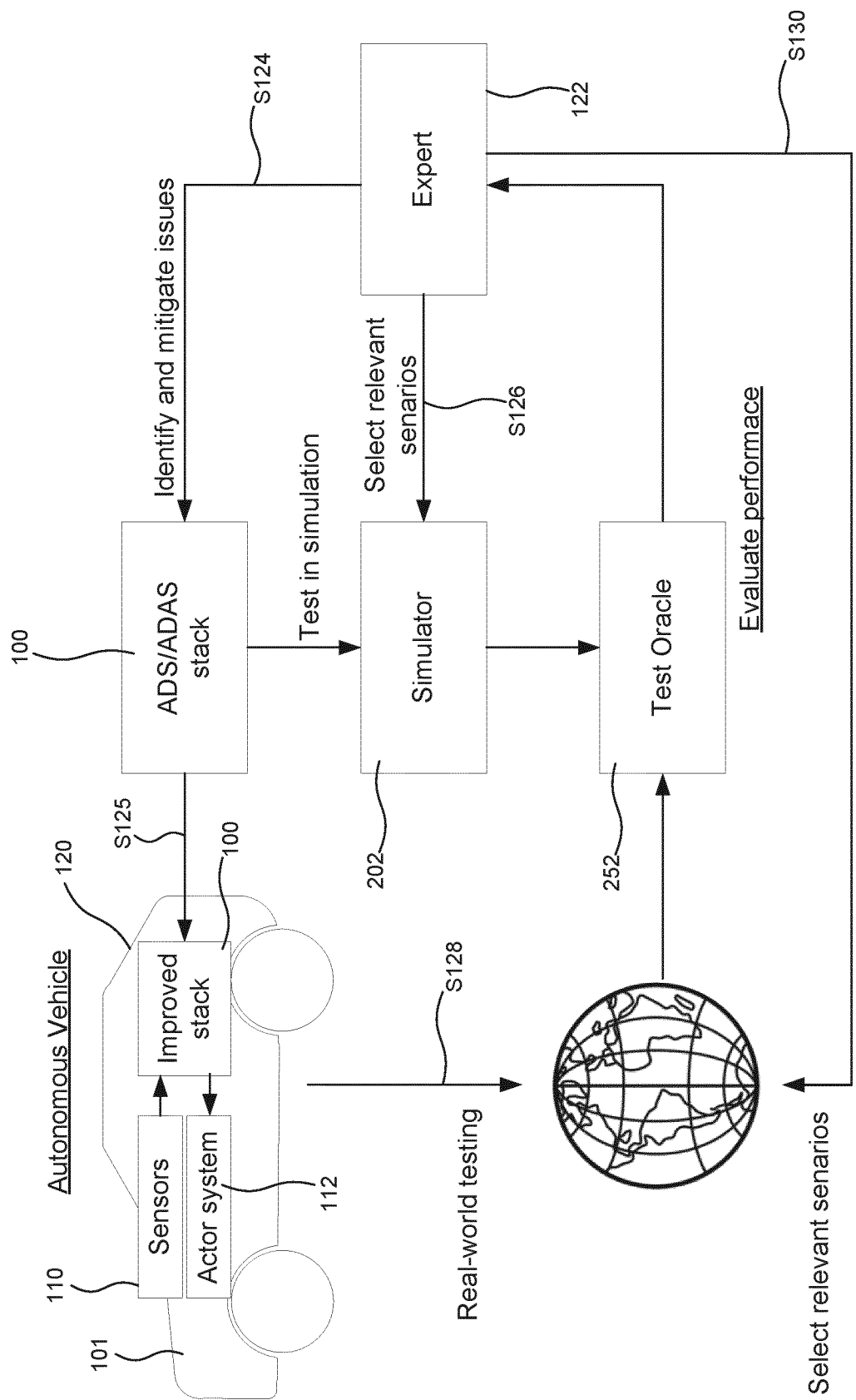
FIG. 1B shows a schematic overview of an autonomous vehicle testing paradigm.

FIG. 1B shows a highly schematic overview of a testing paradigm for autonomous vehicles. An ADS/ADAS stack 100, e.g. of the kind depicted in FIG. 1A, is subject to repeated testing and evaluation in simulation, by running multiple scenario instances (runs) in a simulator 202, and evaluating the performance of the stack 100 (and/or individual sub-stacks thereof) in a test oracle 252. A "run" can be real or simulated in general, and FIG. 1B considers testing based on a combination of simulated and real-world runs. The output of the test oracle 252 is informative to an expert 122 (team or individual), allowing them to identify issues in the stack 100 and modify the stack 100 to mitigate those issues (S124). The results also assist the expert 122 in selecting further scenarios for testing (S126), and the process continues, repeatedly modifying, testing and evaluating the performance of the stack 100 in simulation. The improved stack 100 is eventually incorporated (S125) in a real-world AV 101, equipped with a sensor system 110 and an actor system 112. The improved stack 100 typically includes program instructions (software) executed in one or more computer processors of an on-board computer system of the vehicle 101 (not shown). The software of the improved stack is uploaded to the AV 101 at step S125. Step S1 may also involve modifications to the underlying vehicle hardware. On board the AV 101, the improved stack 100 receives sensor data from the sensor system 110 and outputs control signals to the actor system 112. Real-world testing (S128) can be used in combination with simulation-based testing. For example, having reached an acceptable level of performance though the process of simulation testing and stack refinement, appropriate real-world scenarios may be selected (S130), and the performance of the AV 101 in those real scenarios may be captured and similarly evaluated in the test oracle 252.

Scenarios can be obtained for the purpose of simulation in various ways, including manual encoding. The system is also capable of extracting scenarios for the purpose of simulation from real-world runs, allowing real-world situations and variations thereof to be re-created in the simulator 202.

Figure 1C:
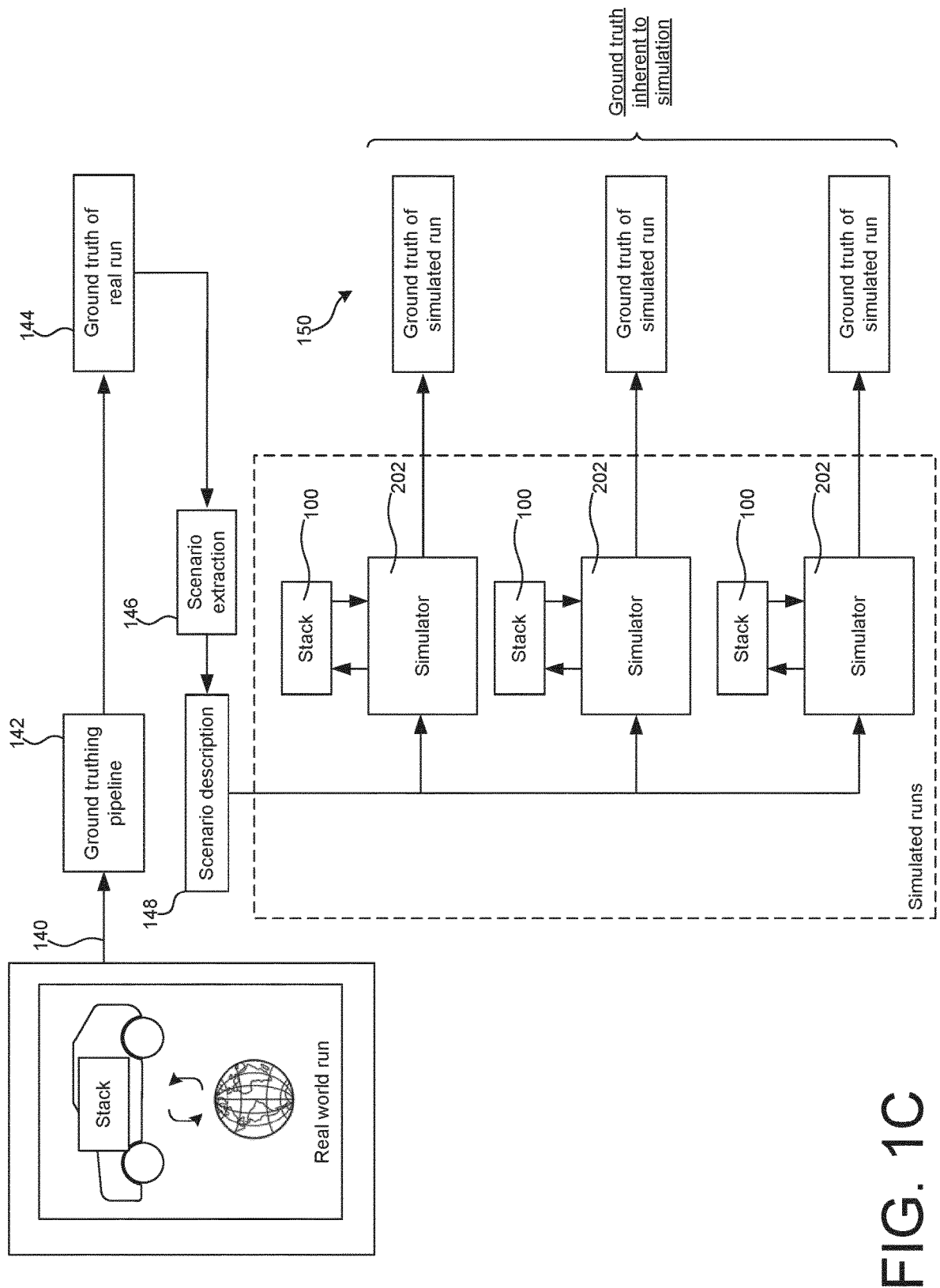
FIG. 1C shows a schematic block diagram of a scenario extraction pipeline.

FIG. 1C shows a highly schematic block diagram of a scenario extraction pipeline. Data 140 of a real-world run is passed to a 'ground-truthing' pipeline 142 for the purpose of generating scenario ground truth. The run data 140 could comprise, for example, sensor data and/or perception outputs captured/generated on board one or more vehicles (which could be autonomous, human-driven or a combination thereof), and/or data captured from other sources such external sensors (CCTV etc.). The run data is processed within the ground truthing pipeline 142, in order to generate appropriate ground truth 144 (trace(s) and contextual data) for the real-world run. As discussed, the ground-truthing process could be based on manual annotation of the 'raw' run data 140, or the process could be entirely automated (e.g. using offline perception method(s)), or a combination of manual and automated ground truthing could be used. For example, 3D bounding boxes may be placed around vehicles and/or other agents captured in the run data 140, in order to determine spatial and motion states of their traces. A scenario extraction component 146 receives the scenario ground truth 144, and processes the scenario ground truth 144 to extract a more abstracted scenario description 148 that can be used for the purpose of simulation. The scenario description 148 is consumed by the simulator 202, allowing multiple simulated runs to be performed. The simulated runs are variations of the original real-world run, with the degree of possible variation determined by the extent of abstraction. Ground truth 150 is provided for each simulated run.

Test Oracle Rules

Figure 3A:
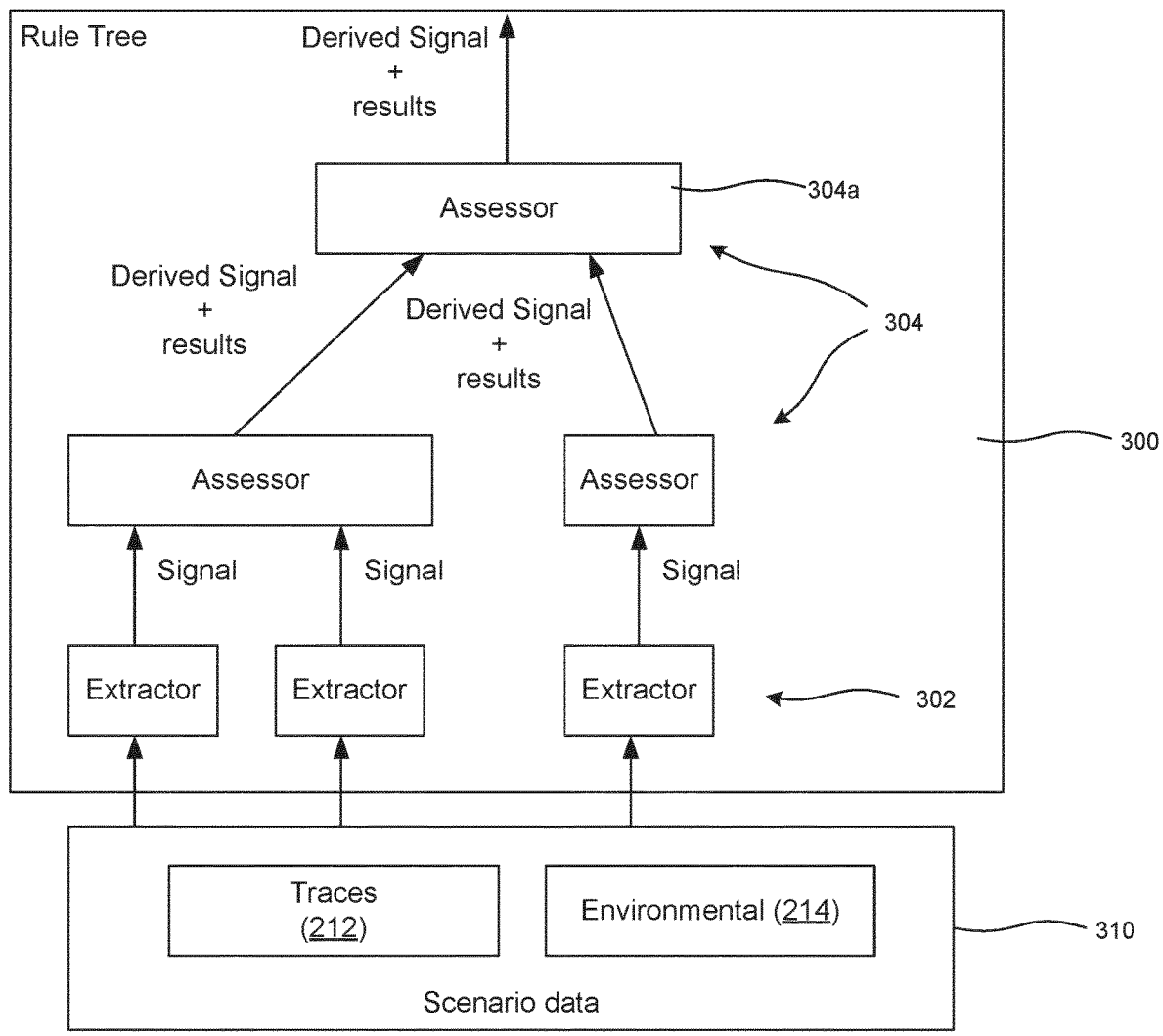
FIG. 3A shows an example of a rule graph evaluated within a test oracle.

Rules are constructed within the test oracle 252 as computational graphs (rule graphs or rule trees). FIG. 3A shows an example of a rule graph 300 constructed from a combination of extractor nodes (leaf objects) 302 and assessor nodes (non-leaf objects) 304. Each extractor node 302 extracts a time-varying numerical (e.g. floating point) signal (score) from a set of scenario data 310. The scenario data 310 may be referred to as the scenario "ground truth" in this context. The scenario data 310 has been obtained by deploying a trajectory planner (such as the planner 106 of FIG. 1A) in a real or simulated scenario, and is shown to comprise ego and agent traces 212 as well as environmental data 214. In the simulation context of FIG. 2 or 2A, the scenario ground truth 300 is provided in the output of the simulator 202.

Each assessor node 304 is shown to have at least one child object (node), where each child object is one of the extractor nodes 302 or another one of the assessor nodes 304. Each assessor node receives output(s) from its child node(s) and applies an assessor function to those output(s). The output of the assessor function is a time-series of categorical results. The following examples consider simple binary pass/fail results, but the techniques can be readily extended to non-binary results. Each assessor function assesses the output(s) of its child node(s) against a predetermined atomic rule. Such rules can be flexibly combined in accordance with a desired safety model.

In addition, each assessor node 304 derives a time-varying numerical signal from the output(s) of its child node(s), which is related to the categorical results by a threshold condition (see below).

A top-level root node 304a is an assessor node that is not a child node of any other node. The top-level node 304a outputs a final sequence of results, and its descendants (i.e. nodes that are direct or indirect children of the top-level node 304a) provide the underlying signals and intermediate results.

Figure 3B:
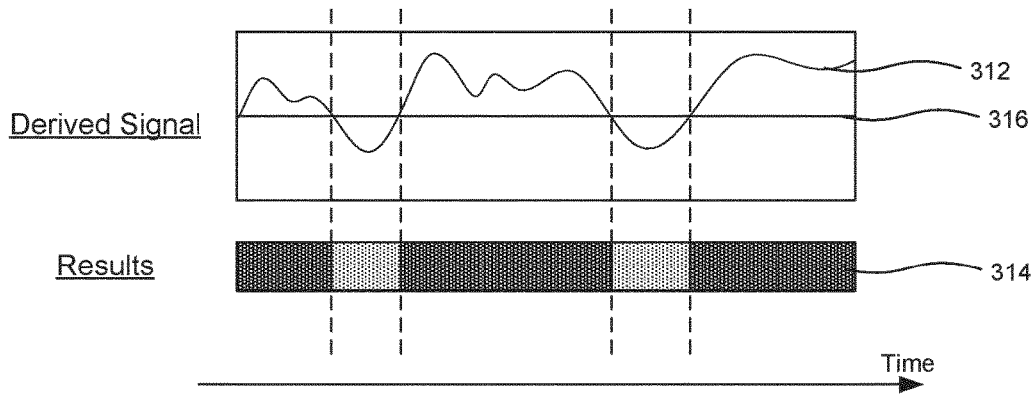
FIG. 3B shows an example output of a node of a rule graph.

FIG. 3B visually depicts an example of a derived signal 312 and a corresponding time-series of results 314 computed by an assessor node 304. The results 314 are correlated with the derived signal 312, in that a pass result is returned when (and only when) the derived signal exceeds a failure threshold 316. As will be appreciated, this is merely one example of a threshold condition that relates a time-sequence of results to a corresponding signal.

Signals extracted directly from the scenario ground truth 310 by the extractor nodes 302 may be referred to as "raw"

signals, to distinguish from "derived" signals computed by assessor nodes 304. Results and raw/derived signals may be discretised in time.

Figure 4A:
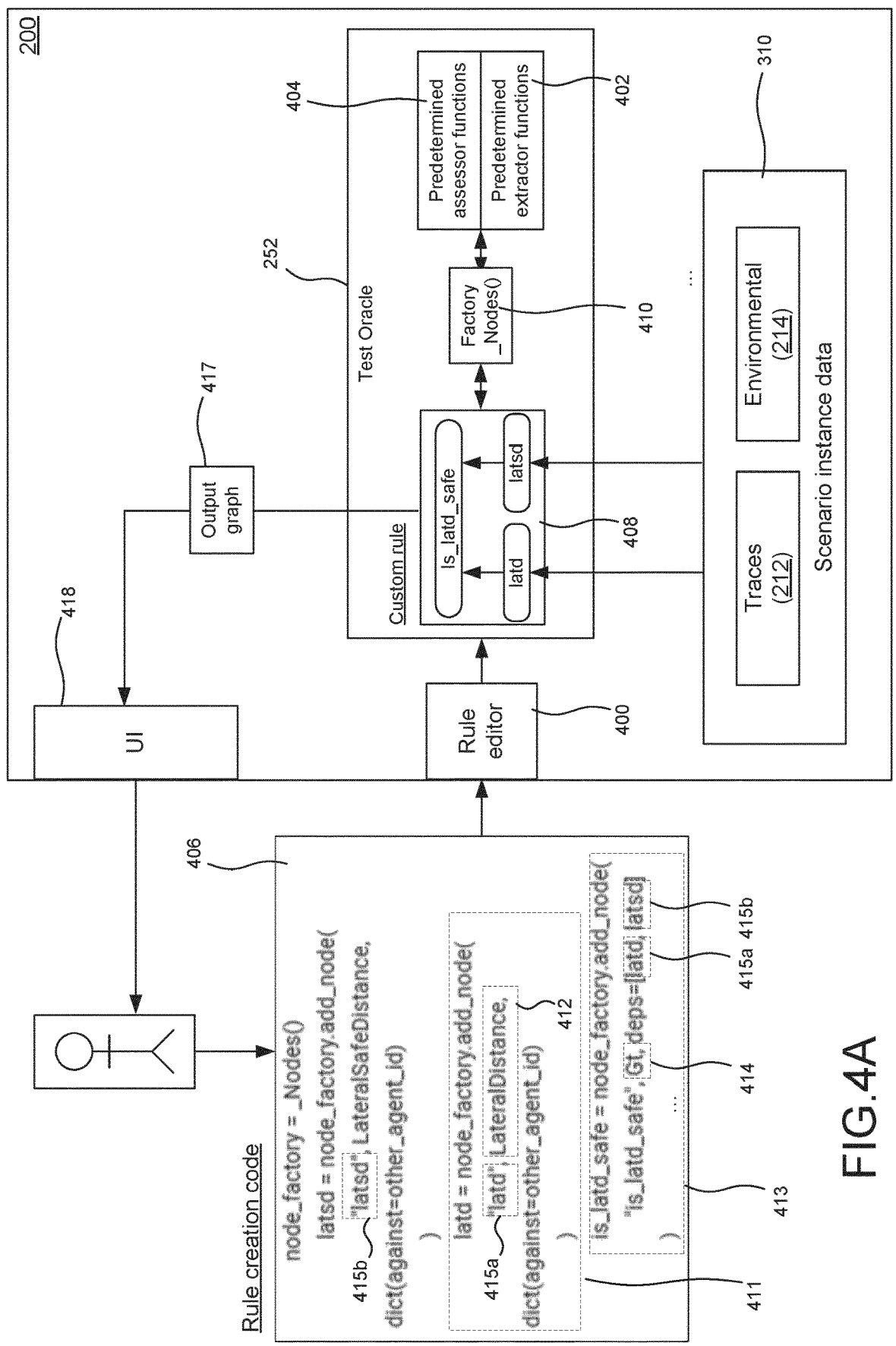
FIG. 4A shows a rule editor for creating custom rule graphs to be evaluated within a test oracle.

FIG. 4A shows how custom rule graphs can be constructed within the testing platform 200. The test oracle 252 is configured to provide a set of modular "building blocks", in the form of predetermined extractor functions 402 and predetermined assessor functions 404.

A rule editor 400 is provided, which receives rule creation inputs from a user. The rule creation inputs are coded in a domain specific language (DSL), and an example section of rule creation code 406 is depicted. The rule creation code 406 defines a custom rule graph 408 of the kind depicted in FIG. 3A. The rule editor 400 interprets the rule creation code 406 and implements the custom rule graph 408 within the test oracle 252.

Within the code 406, an extractor node creation input is depicted and labelled 411. The extractor node creation input is shown to comprise an identifier 412 of one of the predetermined extractor functions 402.

An assessor node creation input 413 is also depicted, and is shown to comprise an identifier 414 of one of the predetermined assessor functions 404. Here, the input 413 instructs an assessor node to be created with two child nodes, having node identifiers 415a, 415b (which happen to be extractor nodes in this example, but could be assessor nodes, extractor nodes or a combination of both in general).

The nodes of the custom rule graph are objects in the object-oriented programming (OOP) sense. A node factory class (Nodes( )) is provided within the test oracle 252. To implement the custom rule graph 408, the node factory class 410 is instantiated, and a node creation function (add_node) of the resulting factory object 410 (node-factory) is called with the details of the node to be created.

The following examples consider atomic rules that are formulated as atomic logic predicates. Examples of basic atomic predicates include elementary logic gates (OR, AND etc.), and logical functions such as "greater than", (Gt(a,b)) (which returns true when a is greater than b, and false otherwise).

The example rule creation code 406 uses a Gt building block to implement a safe lateral distance rule between an ego agent and another agent in the scenario (having agent identifier "other_agent_id"). Two extractor nodes (latd, latsd) are defined in the code 406, and mapped to predetermined LateralDistance and LateralSafeDistance extractor functions respectively. Those functions operate directly on the scenario ground truth 310 to extract, respectively, a time-varying lateral distance signal (measuring a lateral distance between the ego agent and the identified other agent), and a time-varying safe lateral distance signal for the ego agent and the identified other agent. The safe lateral distance signal could depend on various factors, such as the speed of the ego agent and the speed of the other agent (captured in the traces 212), and environmental conditions (e.g. weather, lighting, road type etc.) captured in the environmental data 214. This is largely invisible to an end-user, who simply has to select the desired extractor function (although, in some implementations, one or more configurable parameters of the function may be exposed to the end-user).

An assessor node (is_latd_safe) is defined as a parent to the latd and latsd extractor nodes, and is mapped to the Gt atomic predicate. Accordingly, when the rule graph 408 is implemented, the is_latd_safe assessor node applies the Gt function to the outputs of the latd and latsd extractor nodes, in order to compute a true/false result for each timestep of the scenario, returning true for each time step at which the latd signal exceeds the latsd signal and false otherwise. In this manner, a "safe lateral distance" rule has been constructed from atomic extractor functions and predicates; the ego agent fails the safe lateral distance rule when the lateral distance reaches or falls below the safe lateral distance threshold. As will be appreciated, this is a very simple example of a custom rule. Rules of arbitrary complexity can be constructed according to the same principles.

Figure 5:
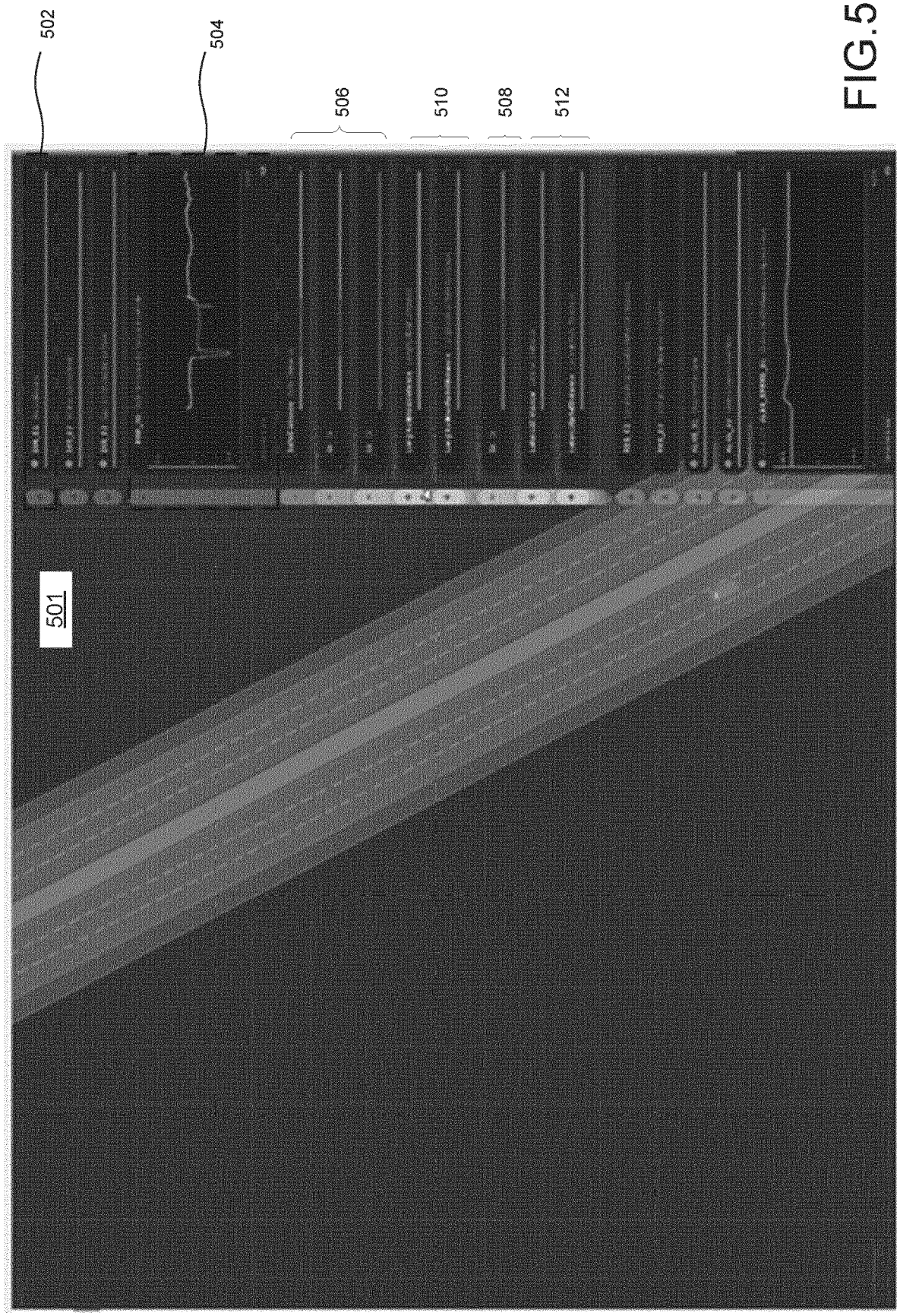

The test oracle 252 applies the custom rule graph 408 to the scenario ground truth 310, and provides the results in the form of an output graph 417—that is to say, the test oracle 252 does not simply provide top-level outputs, but provides the output computed at each node of the custom rule graph 408. In the "safe lateral distance example", the time-series of results computed by the the is_latd_safe node are provided, but the underlying signals latd and latsd are also provided in the output graph 417, allowing the end-user to easily investigate the cause of a failure on a particular rule at any level in the graph. In this example, the output graph 417 is a visual representation of the custom rule graph 408 that is displayed via a user interface (UI) 418; each node of the custom rule graph is augmented with a visualization of its the output (see FIG. 5).

Figure 4B:
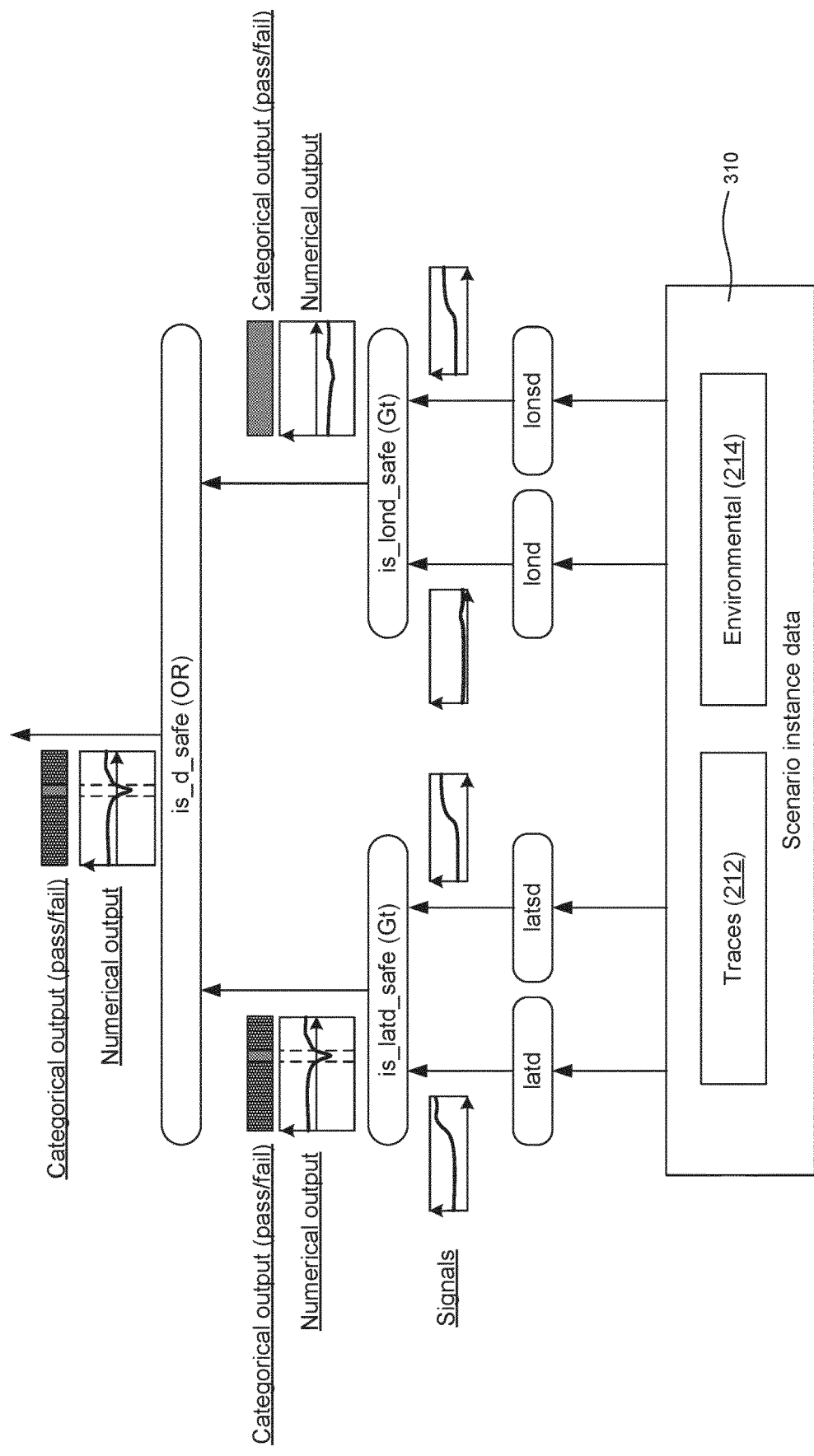
FIG. 4B shows an example custom rule graph evaluated on a set of scenario ground truth data.

FIG. 4B shows an example of a custom rule graph that includes a lateral distance branch corresponding to that of FIG. 4A. Additionally, the graph includes a longitudinal distance branch, and a top-level OR predicate (safe distance node, is_d_safe) to implement a safe distance metric. Similar to the longitudinal distance branch, the lateral distance brand extracts lateral distance and lateral distance threshold signals from the scenario data (extractor nodes lond and lonsd respectively), and a longitudinal safety assessor node (is_lond_safe) outputs true TRUE when the lateral distance is above the safe lateral distance threshold. The top-level OR node returns TRUE when one or both of the lateral and longitudinal distances is safe (below the applicable threshold), and FALSE if neither is safe. In this context, it is sufficient for only one of the distances to exceed the safety threshold (e.g. if two vehicles are driving in adjacent lanes, their longitudinal separation is zero or close to zero when they are side-by-side; but that situation is not unsafe if those vehicles have sufficient lateral separation).

The numerical output of the top-level node could, for example, be a time-varying robustness score.

The rule editor 400 allows rules to be tailored, e.g. to implement different safety models, or to apply rules selectively to different scenarios (in a given safety model, not every rule will necessarily be applicable to every scenario; with this approach, different rules or combinations of rules can be applied to different scenarios).

The above examples consider simple logical predicates evaluated on results or signals at a single time instance, such as OR, AND, Gt etc. However, in practice, it may be desirable to formulate certain rules in terms of temporal logic.

Hekmatnej ad et al., "Encoding and Monitoring Responsibility Sensitive Safety Rules for Automated Vehicles in Signal Temporal Logic" (2019), MEMOCODE '19: Proceedings of the 17th ACM-IEEE International Conference on Formal Methods and Models for System Design (incorporated herein by reference in its entirety) discloses a signal temporal logic (STL) encoding of the RSS safety rules. Temporal logic provides a formal framework for constructing predicates that are qualified in terms of time. This means that the result computed by an assessor at a given time instant can depend on results and/or signal values at another time instant(s).

For example, a requirement of the safety model may be that an ego agent responds to a certain event within a set time frame. Such rules can be encoded as temporal logic predicates.

FIG. shows an example graphical user interface (GUI) view. Multiple output graphs are available via the GUI, displayed in association with a visualization 501 of the scenario ground truth to which the output graph relates. Each output graph is a visual representation of a particular rule graph that has been augmented with a visualization of the output of each node of the rule graph. Each output graph is initially displayed in a collapsed form, with only the root node of each computation graph represented. First and second visual elements 502, 504 represent the root nodes of first and second computational graphs respectively.

The first output graph is depicted in a collapsed form, and only the time-series of binary pass/fail results for the root node is visualized (as a simple colour-coded horizontal bar within the first visual element 502). However, the first visual element 502 is selectable to expand the visualization to lower-level node(s) and their output(s).

The second output graph is depicted in an expanded form, accessed by selecting the second visual element 504. Visual elements 506, 508 represent lower-level assessor nodes within the applicable rule graph, and their results are visualized in the same way. Visual elements 510, 512 represent extractor nodes within the graph.

The visualization of each node is also selectable to render an expanded view of that node. The expanded view provides a visualization of the time-varying numerical signal computed or extracted at that node. The seconds visual element 504 is shown in an expanded state, with a visualization of its derived signal displayed in place of its binary sequence of results. The derived signal is colour-coded based on the failure threshold (as noted, the signal dropping to zero or below denotes failure on the applicable rule).

The visualizations 510, 512 of the extractor nodes are expandible in the same way to render visualizations of their raw signals.

Safety rules can be constructed and visualized in this manner, as can rules pertaining to comfort, progress etc.

Odd-Based Response Rules

FIG. 6 shows an extended rule editor 600 that additionally permits rules to be defined in relation to internal state data of the (full or partial) stack 100 under testing. The extended rule editor 600 is shown to comprise a converter 610 and interpreter 612. The interpreter 612 receives and interprets rule creation inputs in the DSL, and constructs custom rule graphs within the test oracle 252 according to those inputs. As denoted above, users can code rules in the DSL directly, denoted by a first input 614 to the interpreter 612.

The converter 610 is a second source of DSL rule creation inputs. The converter is shown having a first input to receive an ODD specification 602, and a second input to receive an ontology specification 604. An output of the converter 610 is shown connected to an input of the interpreter 612.

The ODD specification 602 contains a precise definition of an ODD. The ODD is defined in term of intuitive ODD "concepts" (classes/categories such as light rain, daylight etc.). The ontology specification 604 maps those concepts onto variables/ranges (such as light intensity level, or rain intensity level in mm per hour etc.). The user is free to define bespoke concepts in the ODD specification 602, and define the mapping of those bespoke concepts to measurable variables in the ontology specification 604.

The converter 610 converts the ODD specification 602 into DSL code. The DSL code defines an ODD-based response rule 60 that can be applied to the ground truth of a scenario, in order to test the performance of the stack 100 outside of its ODD. The ODD-based response rule 60 is implemented as a computation graph that constructed in largely the same way as other rule graphs, i.e. using the predetermined assessor and extractor functions 402, 404 applied to the scenario ground truth.

FIG. 7 shows an example of an ODD-based response rule 60 applied to a set of scenario ground truth data 310. In addition to the scenario ground truth 310, the ODD-based response rule 60 requires access to an internal state 700 of the stack 100 under testing. The internal state 700 encapsulates the stack's own assessment as to whether or not it is currently operating within its ODD. For a level 3 stack, the stack might transition from a "normal" state to a "transition demand" state when it detects some change that necessitates human intervention. For a level 4 stack, the stack might additionally transition to a "MRM" state if the stack 100 detects no human intervention within some specified time interval after the transition demand (and should, at that point, proceed to implement a suitable MRM). The time interval may be specified in the ODD, or elsewhere.

An ODD subgraph 710 is responsible for determining whether or not the scenario ground truth 310 is within the defined ODD at any given time instant. The ODD subgraph 710 is constructed in the same way as trajectory evaluation rules, using bespoke combinations of predetermined extractor and assessor functions 402, 404. The ODD subgraph 710 is shown to comprise extractor nodes 714, which extract time-varying signals from the scenario ground truth 310, and assessor nodes 712 that encode the ODD (or, more precisely, the conditions that must be satisfied for the scenario ground truth 310 to be within the defined ODD). A root node 702 of the ODD subgraph 710 (in_ODD) outputs a final determination as to whether the scenario is within the ODD at any given time instant of the scenario.

Transition demand and MRM nodes 704, 706 are also shown which determine, respectively, whether or not the stack 100 is in a transition demand state or MRM state at any given time instant.

A root node 701 of the computational graph 30 makes a top-level pass/fail evaluation, based on the outputs of the in_ODD, transition_demand and MRM nodes 702, 704, 706 (its direct child nodes). The rule requires that, in the event of a change in the scenario ground truth 310 that takes the scenario outside of the defined ODD:

1. a transition demand occurs within the stack 100, within a first time interval (T1) from the change in the scenario ground truth 310, and
2. a minimum risk maneuver is instigated within the stack 100, within a second time interval (T2) from the transition demand.

Compliance/non-compliance with conditions 1 and 2 is determined from the internal stack state 700. The above rule would be suitable for evaluating the overall response of a level 4 stack; alternatively, separate rule graphs may be constructed for transition demands and minimum risk maneuvers respectively. For a level 3 stack, condition 2 may be omitted. These condition(s) can, for example, be implemented as a suitable temporal logic predicate applied to the outputs of the direct child nodes 702, 704, 706, e.g. that returns FALSE if no transition demand occurs within the first time interval T1 or no MRM is triggered within the second time interval T2.

To take a relatively simple example, suppose the ODD is defined as all possible conditions within some geofenced area (including any weather and lighting conditions), but only certain lighting and weather conditions outside of this area. In other words, within the geofenced area, the stack must be able to operate autonomously under any conditions, but outside of the geofenced area, it can only operate autonomously under certain weather and lighting conditions. Those weather and lighting conditions might be defined as "daylight" and "light rain" concepts in the ODD specification 602, which in turn are mapped to corresponding numerical ranges in the ontology specification 604. The rule editor 600 can convert the ODD specification 602 to a computational graph 605, implemented in the test oracle 252 based on thresholds and atomic logic operators. Extractor nodes are created for extracting a geolocation of the ego agent, a light intensity level and a rain intensity level as respective time-varying signals. A first assessor node operates on the geolocation signal to determine whether the geolocation of the ego agent is currently within the geofenced region. Second and third assessors are configured receive the extracted light and rain intensity signal respectively, and apply respective thresholds to those signals. Those thresholds are specified in the ontology specification 604 for the "daylight" and "light rain" concepts of ODD specification 602. In this case, the in_ODD node returns TRUE if the geolocation of the ego agent is within with geofenced regions or the light intensity level and the rain intensity level both satisfy their respective threshold requirements. For example, the "daylight" concept might require the light intensity signal to exceed some threshold, and the "light rain" concept might require the rain intensity signal to be below some threshold.

The ODD subgraph 710 makes an "external" assessment, outside of the stack 100 under testing, as to whether or not the scenario is currently within the ODD, based on the scenario ground truth 310. The stack 100 itself typically has a more limited "view" of the scenario than that provided the scenario ground truth 310. For example, certain parts of the scenario may be obscured (due to physical sensor limitations, or deliberate limitations imposed in simulation to more accurately reflect real-world driving conditions), or the stack 100 may be subject to other forms of (real or simulated) perception error etc. Such factors could contribute to a failure to implement a transition demand or MRM in time (or, in other words, a failure of the stack 100 itself to determine that the scenario is no longer within its ODD).

FIG. 9 shows how an ODD specification 602 may be implement both within a stack 100, at runtime, but also externally for the purpose of testing. In this example, the stack 900 comprises an online processing component 900 which receives perception outputs (real or simulated) and compares those outputs to the ODD specification 602, in order to make its own determination as to whether or not it is currently within its ODD. That online determination is reflected in the internal state data 700. European Patent Application No. 20194499.8, incorporated herein by reference in its entirety, discloses techniques that can be implement within the stack 100 to make such an online determination.

The ODD-based response rule within the test oracle is implemented based on the same ODD specification 602. However, within the test oracle, the assessment as to whether or not the scenario is within the ODD is made based on the external scenario ground truth 310, and checked against the internal state data 700.

Moreover, the stack 100 is typically constrained to operate in real-time, but the test oracle 252 is not necessarily constrained in the same way. Therefore, the stack 100 may have to make certain "compromises" when it evaluates the perception outputs against the ODD that could result in errors. Such errors could be revealed by the test oracle 252, which is not subject to the same constraints.

The described framework permits modifications to the ODD specification 602 or the ontology specification 604. When one or both of the aforementioned is modified, the ODD-based response rule graph 60 can be modified accordingly and re-evaluated against the same scenario ground truth 310 and internal stack state 700.

To improve efficiency, earlier computations are cached and re-used to the extent possible. Suppose, in the previous example, the threshold for "light rain" is modified in the ontology specification 604. This can be implemented as a simple threshold adjustment for the "light rain" assessor node. Only a first subset of the graph (made up of the light rain assessor node and any nodes that are dependent on its output) is affected by the modification, and needs to be revaluated; this leaves a second subset of the graph, common to the original and modified ODD specification 602, that is unaffected and whose previous computations can be reused.

As noted, ODD-based response rule(s) can be applied in combination with trajectory evaluation rule(s) that evaluate the ego trajectory in respect of safety, progress, comfort etc. That evaluation is based on the traces 212, and is independent of the internal state 700 (of course, the internal state 700 might influence the traces 212, but the internal state 700 does not provide any input to the trajectory evaluation rules).

For MRMs, there are two aspects to testing: testing whether the MRM has been instigated correctly, based on the internal state 700, but also testing whether the MRM results in safe behaviour, based on the ego trace 212a. The latter evaluates the "success" of the MRM in the exactly the same way as the driving of a system not in an MRM state is evaluated.

Note that the transition demand and MRM terminology used herein is not tied to any particular standard or regulation. Transition demand refers to any requirement for human driver intervention, and MRM refers to any autonomous action(s) that is required absent such intervention in the required timeframe. Whilst the above examples consider transition demands and MRMs, the present techniques can be applied to any required state change linked to the ODD.

Ontology Framework

Further details of the ontology framework are described below. In the following examples, the ODD specification 602 and ontology specification 604 are coded in a formal ontology language. In this case, the rule editor 600 operated as an interface between the ontology language and the DSL used to construct rules in the test oracle 252.

A core challenge in autonomous driving is understanding the extent of an autonomous vehicle's (AV's) capability. In autonomous driving parlance, this may be characterized as an Operational Design Domain (ODD) problem. For example, the SAE J3016 Information Report defines an ODD as:

"Operating conditions under which a given driving automation system [ADS] or feature thereof is specifically designed to function, including, but not limited to, environmental, geographical, and time-of-day restrictions, and/or the requisite presence or absence of certain traffic or roadway characteristics."

SAE J3016 is the origin of Levels 0 to 5 of autonomous driving. The aim of the ODD is to characterize the (possible) technical limitations of an ADS, ADAS or feature (as opposed to mere regulatory or social restrictions). Examples of ODDs given in SAE J3016 include:

"A level 4 ADS-DV [Dedicated Vehicle] designed to operate exclusively within a corporate campus where it picks up and discharges passengers along a specific route specified by the ADS-DV dispatcher.

"A level 4 ADS-DV designed to operate exclusively within a geographically prescribed central business district where it delivers supplies using roads (but not necessarily routes) specified by the ADS-DV dispatcher"

Taking geographic restrictions on the ODD as an example, an ADS might only be designed to operate within a particular, pre-mapped geographic area, e.g. within the ground of an airport or a particular urban center. Basic geographic restrictions like these could be enforced using geo-fencing or similar technology to disengage the ADS outside of the defined area, forcing driver intervention in that event. Other restrictions on the ODD, such as to certain weather conditions or to road driving with clearly discernible lane markings, could be similarly enforced.

It is relatively straightforward to apply the concept of an ODD to simple examples like those above. However, one issue that arises is the potentially complex interaction between different contributing factors, e.g. to take an example that is still relatively simple, it might be that an ADS is capable of operating on both marked and unmarked roads in clear weather conditions, but can only operate on roads with clear markings in light-to-medium rain, and is not capable of operating at all in heavy rain. Another issue is precision—taking adaptive cruise control as an example, it may be that a particular ACC component is only designed to operate within a certain minimum headway to a forward vehicle, which might, for example, be dependent on weather or lighting conditions. Precise, detailed characterization of an ODD is difficult within the existing framework. Moreover, the limits of an ODD can change over time e.g. because further testing demonstrates an existing ADS to be more capable of accommodating a greater range of operating conditions, or because the ADS has been developed further, or a combination of both—compounding these issues further.

As the complexity scales, it becomes harder and harder to precisely characterize an ODD within the existing, descriptive SAE J3016 framework. The existing framework is also heavily reliant on the skill and knowledge of individual experts or teams to correctly and precisely characterize the ODDs their systems or features and, as the complexity increases, the scope for errors also increase. Mischaracterizing an ODD can have disastrous, even fatal consequences; it is a safety-critical task.

The following examples formalize the concept of an ODD within a formal ontology. This allows precise assessments to made as to the capability of an AV stack, and in particular a precise assessment to be made as to whether or not a given driving scenario is within or outside of a defined ODD at a given time instant.

In the context of simulation, unless otherwise indicated, an ontological representation of a simulated scenario means an ontological representation of the output of the simulator 202, i.e. of the traces 212 generated by the simulator 202 and the associated environmental data 214. By contrast, the scenario description 201 is the input to the simulator 202. The outputs 212, 214 are partially determined by the inputted scenario description 201, but also by the decisions taken by the stack 100 under consideration, any decisions taken by the agent decision logic 210 (as applicable), and the responses of the agent dynamic models 202, 206. In other words, unless otherwise indicated, in the context of simulation, "scenario description" refers to the input to the simulator 202 on which a simulation is based, whereas "scenario representation" refers to an ontological representation of the output of the simulator 202 that would generally reflect agent dynamics, and in particular ego agent dynamics driven by decisions made within the stack 100 under testing during the simulation.

For the most basic form of ODD, it might be possible to classify a scenario as within or outside of the ODD solely on the basis of the scenario description 201. For example, with a basic geographic ODD constraint (e.g. restricting the ODD to a particular geographic region, as in the SAE J3016 examples above), if the scenario description 201 has some deterministic geographic parameter outside of this, that might mean that any scenario simulated on the basis of that scenario description necessarily be outside of the ODD, irrespective of how the simulated scenario actually plays out in the simulator 202.

However, a key benefit of the present framework is the ability to define the ODD in relation to the dynamics of a scenario, such as changing environmental conditions (weather, lighting etc.) or behaviour of the agents (as captured in the traces 212).

FIG. 8A shows an example view rendered via a graphical user interface (GUI) for defining and editing road elements of an ontology specification 604 (RoadDescription.ontology). FIG. 8B shows a view an ODD specification 602 (London.odd). The ODD of FIG. 8B precisely defines a subset of the ontology that includes the road elements of FIG. 8A, allowing concepts in the ODD specification 602 to me mapped to measurable signals.

A worked example is set out below. The ontology specification 604 and ODD specification 602 are coded in a formal, hierarchical ontology language that is interpreted and applied within the system in the manner described above.

At the top level, a "world scene" is defined, which defines an instant snapshot of a scenario:

---

WorldScene.ontology
five ai ontology specification WorldScene
class WorldScene : "The top level class for specifying the ODD-type scene for an EGO"
    attribute EgoState as EgoState
    attribute EnvironmentalState as EnvironmentalState
    attribute RoadStructure as RoadStructure
    attribute ActiveRoadState as ActiveRoadState

---

An environmental part of the ontology is defined hierarchically. The definition is based on real-world (or simulated) values, such as weather and other environmental conditions:

---

EnvironmentalState.ontology
five ai ontology specification EnvironmentalState
class EnvironmentalState : "The conditions associated with the state of the environment."
    attribute SkyCondition as SkyCondition
    attribute WeatherCondition as WeatherCondition
    attribute GroundCondition as GroundCondition
    optional attribute WindLevel as WindLevel default Calm
    optional attribute AirParticulateMatter as AirParticulateMatter default ClearAir

```
class WeatherCondition : "The types of weather that the Five AI
Ontology distinguishes"
    values type = number range = [0,) units = "mm/h"
    class ClearCalm :: WeatherCondition : "Dry weather with little
wind"
        values type = number range = [0,0] units = "mm/h"
    class AdverseConditions :: WeatherCondition : "Conditions that
adversely affect the vehicle"
        class Snow :: AdverseConditions : "Snowing"
            values type = number range = (0,) units = "mm/h"
        class Sleet :: AdverseConditions : "Sleet Shower"
            values type = number range = (0,) units = "mm/h"
        class Rain :: AdverseConditions : "A level of rain that
requires some use of wipers"
            values type = number range = (0,) units = "mm/h"
            class LightRain :: Rain : "Light rain requiring
intermittent wipers"
                values subrange = (0,5]
            class ModerateRain :: Rain : "Rain requiring regular
wipers"
                values subrange = (5,20)
            class HeavyRain :: Rain : "Rain requiring high-speed
wipers"
                values subrange = [20,)
class SkyCondition : "The state of the sky: sun position, time of
day"
    values type = number range = [0,8] units = "okta"
    attribute SunPosition as SunPosition
    attribute TimeOfDay as TimeOfDay
    class ClearSkies :: SkyCondition : "Completely clear sky"
        values subrange = [0,1)
    class PartlyCloudy :: SkyCondition : "Up to half of the sky is
covered in clouds"
        values subrange = (1,4)
    class Overcast :: SkyCondition : "Most or all of the sky is
covered in clouds"
        values subrange = [5,8]
class SunPosition : "The compass position of the sun"
    values type = number range = [0,360] units = "degrees"
    class SunFromEast :: SunPosition : "Morning sun"
        values subrange = (45,135]
    class SunFromSouth :: SunPosition : "Afternoon sun"
        values subrange = (135,225]
    class SunFromWest :: SunPosition : "Evening sun"
        values subrange = (225,315]
    class SunFromNorth :: SunPosition : "We ain't in the southern
hemisphere"
        values subrange = (315,45]
class TimeOfDay : "The classification of the day, given by sub
position above horizon"
    values type = number range = [-90,90] units = "degrees"
    class Daylight :: TimeOfDay : "Light when the sun is
completely up"
        values subrange = (6,90]
    class Twilight :: TimeOfDay : "civil or nautical twilight,
when streetlights and road road users headlights are
            expected to be on but are not
the main source of lighting"
        values subrange = (-12,6]
        attribute ArtificialLight as AdditionalLighting
    class Dark :: TimeOfDay : "astronomical twilight or night,
with little/no streetlight and main source of lights are EGO's own
and other road users headlights"
        values subrange = [-90,-12]
        attribute ArtificialLight as AdditionalLighting
    class ArtificialLight : "When the bulk of light for the EGO
comes from artificial sources"
        class Streetlights :: ArtificialLight : "twilight or night
where the main source of road lighting is streetlights"
        class Headlights :: ArtificialLight : "Mean source of light is
EGO headlights"
            class RegularHeadlights :: Headlights : "main source of
light is EGO regular beams"
            class FullBeamHeadlights :: Headlights : "main source of
light is EGO high beams"
        class VehicleLighting :: ArtificialLight : "arti"
            class OverheadVehicleLights :: VehicleLighting: "scene
light is dominated by lorry overhead lights"
            class BackVehicleLights :: VehicleLighting : "scene with
vehicle back lights"
            class FrontVehicleLights :: VehicleLighting : "scene with
vehicle front-lights affecting camera"
/* The weather */
class WindLevel : "The speed of the wind that may disturb dynamic
object or EGO trajectory"
    values type = number range = [0,) units = "m/s wind speed"
    class Calm : "Very little wind affecting the vehicle"
        values subrange = [0,1)
    class LightWinds : "Light winds that move branches, but not
greatly affecting the vehicle."
        values subrange = [1,10)
    class StrongWinds : "Strong winds that greatly affect the
vehicle."
        values subrange = [10,)
/* The Road Conditions */
class GroundCondition : "The state of the road"
    class DryGround :: GroundCondition : "Dry road (independent of
weather) - e.g. under a bridge the road could be dry"
    class IcyGround :: GroundCondition : "Ice on the road"
    class SnowyGround :: GroundCondition : "Snow on the ground
where visibility of ground/lanes or control of vehicles is
affected"
    class WetGround :: GroundCondition : "Liquid coverage on the
ground"
        class NormalWetGround :: WetGround : "road is wet
including small puddles that would not typically cause vehicle
traction/splash issues or water-planing"
        class StandingWaterOnGround :: WetGround : "large puddles,
or large bodies of standing water that could cause large splashes,
water-planing or affect control of EGO"
        class FloodingOnGround :: WetGround : "road/lane flooding
where typically reduced speed is required"
/* Particulate Matter */
class AirParticulateMatter : "The state of the air on the road
that the vehicle is driving"
    class ClearAir :: AirParticulateMatter : "No abnormal air
particulate detected."
    class Fog :: AirParticulateMatter : "Dry road (independent of
weather) - e.g. under a bridge the road could be dry"
    class CarSmoke :: AirParticulateMatter : "smoke from cars
(e.g. in cold winter morning)"
    class SensorParticulate :: AirParticulateMatter : "A
particular type of particulate that *may* directly affect the
sensors directly"
        class DustAirParticulate :: SensorParticulate : "dirt or dust
in the air (e.g. from construction site)"
        class MudAirParticulate :: SensorParticulate : "mud sprays
from vehicles, or splashes from standing water"
        class SprayAirParticulate :: SensorParticulate : "spray from
vehicles or EGO vehicle"
```

As can be seen, the ontology allows environmental classes (concepts) to be defined hierarchically. The above example defines the following "top-level" classes: weather, sky condition, sun position, time of day, wind level, road conditions and particulate matter. Further sub-classes can then be defined hierarchically, in the manner shown. The language allows classes and sub-classes to be mapped onto ranges of numerical measurements (environmental variables).

The sample principles apply to visible road elements, with hierarchical road structure classes similarly mapped to numerical road variables:

```
RoadDescription.ontology
five ai ontology specification RoadDescription
class Road : "The top level specification for the description of
the carriageway"
    attribute SpeedLimit as SpeedLimit
    attribute CentralDividerMarking as CentralDividerMarking
class NormalRoad :: Road : "A normal road"
    optional attribute RoadEdge as NearSideRoadEdge default Curb
    optional attribute RoadsideFeature * as
```

-continued

```
NearSideRoadsideFeature default Pavement
    optional attribute RoadsideMarking as NearSideRoadsideMarking
    attribute RoadScenery as RoadScenery
    attribute RoadGeometry as RoadGeometry
    attribute RoadSurface as RoadSurface default AsphaltSurface
    optional attribute RoadsideObstacle as
NearSideRoadsideObstacle
    attribute Lane * as TrafficLanes
    optional attribute RoadEdge as FarSideRoadEdge default Curb
    optional attribute RoadsideFeature * as FarSideRoadsideFeature
default Pavement
    attribute RoadsideMarking as FarSideRoadsideMarking
    optional attribute RoadsideObstacle as FarSideRoadsideObstacle
class RoadWithoutCentralReservation :: NormalRoad : "A road
without a central reservation"
    class SingleTrackRoad :: RoadWithoutCentralReservation : "Road
limited by definition to only including a single lane in one
carriageway"
        class ResidentalSingleTrack :: SingleTrackRoad : "A
residential road with no lane marking and traffic in both
directions"
        class SingleTrackRoadWithPassingPlaces :: SingleTrackRoad
: "A country road that only has one lane but passing places"
    class MultipleLaneRoad :: RoadWithoutCentralReservation : "A
type of road that can have multiple lanes"
        class OneWayStreet :: MultipleLaneRoad: "A road layout
with only one direction of travel"
        class SingleCarriageway :: MultipleLaneRoad : "A single
carriageway road, without a well-defined center reservation"
class RoadWithCentralReservation :: NormalRoad : " A road with a
central reservation"
    class DualCarriageway :: RoadWithCentralReservation : "A dual
carriageway road, with a well-defined central reservation"
    class Motorway :: RoadWithCentralReservation : "A motorway
class road"
    class Roundabout :: Road : "A roundabout road type"
    attribute RoadFeature as EgoEntrance
    attribute ArmDescription * as RoundaboutArms
    attribute Lane * as RoundaboutLanes
    class NormalRoundabout :: Roundabout: "A roundabout with a
kerbed central island at least 4 m in diameter and dual-lane "
    class LargeRoundabout :: Roundabout: "A roundabout with a
kerbed central island at least 4 m in diameter and more than 4
arms"
    class CompactRoundabout :: Roundabout: "A roundabout with
single-lane entry "
    class MiniRoundabout :: Roundabout: "A roundabout without a
kerbed central island. Instead of kerbed central island there is a
circulatory road marking 1 to 4 m in diameter"
    class SignalledRoundabout :: Roundabout : "A roundabout with
signals controlling access"
class Lane : "An individual lane of traffic"
    attribute LaneDirection as LaneDirection
    attribute Number as LaneNumber
    optional attribute LaneType as LaneType default
NormalLaneOfTraffic
    optional attribute LaneSpecialFeature as LaneSpecialFeature
class ArmLocation : "The roundabout arm"
    values type = number range = [0,360) units = "degrees"
    class FirstQuarter :: ArmLocation : "Near ego entrance"
        values subrange = [0,90)
    class SecondQuarter :: ArmLocation : "Near ego entrance"
        values subrange = [90,180)
    class ThirdQuarter :: ArmLocation : "Near ego entrance"
        values subrange = [180,270)
    class FinalQuarter :: ArmLocation : "Furtherst point"
        values subrange = [270,360)
class ArmDescription : "A roundabout arm"
    attribute Number as ArmNumber
    attribute ArmLocation as ArmLocation
    attribute Lane * as LanesInArm
```

The above component (WorldScene.ontology, EnvironmentalState.ontology and RoadDescription.ontology) are components of the ontology itself, i.e. these define the world in terms of hierarchical classes mapped to numerical variables.

The ODD is a subset of the ontology, i.e. the subset of the world in which an AV can safely operate. The following shows how an ODD may be defined in the same ontology language for a particular city, such as London (UK):

```
London.odd
five ai odd definition London
default is permissive
//Any ontology element not explicitly mentioned will be accepted
as part of the ODD
global definitions
    for GenericTrafficDensity we allow [LowTrafficDensity,
MediumTrafficDensity]
    for ActiveRoadState attribute PertinentSceneElements we do not
allow [LearnerOrNewDriverCar,
        WideLoadLorry,
        ArticulatedBus,
        EmergencyVehicle,
        Cyclist,
        HorseRider,
        NonRoadRespectingObjects]
    for AirParticulateMatter we allow [ClearAir]
    for WeatherCondition we allow [ClearCalm, LightRain]
    for TimeOfDay we allow [Daylight]
    for TimeOfDay we do not allow [Twilight, Dark]
    for WindLevel we do not allow [StrongWinds]
    for GroundCondition we allow [DryGround, WetGround]
    for AlteredCondition we do not allow anything
    for FunctionalManoeuvre we allow [SettingOff,
        LaneFollowing,
        VehicleDistanceModeration,
        StopAndWait,
        LeftTurnMinorToMajor,
        LeftTurnMajorToMinor,
        RoundaboutExit,
        EnterRoundabout,
        OvertakeSingleCarriageway]
    for NonFunctionalManoeuvre we allow [Display IndicatorLights]
    for Road we allow [SingleCarriageway, OneWayStreet,
DualCarriageway,CompactRoundabout]
        for Road attribute RoadSurface we allow
[AsphaltSurface,ConcreteSurface]
        for DualCarriageway attribute RoadSurface we allow
[AsphaltSurface]
        for Road attribute SpeedLimit we do not allow [Ten,
Seventy]
        for Road attribute CentralDividerMarking we allow anything
        for Road attribute RoadScenery we allow
[GreenAvenueCanyonScenery, GreenOpenScenery,
SyntheticAvenueCanyonScenery, SyntheticOpenScenery]
        for SceneEnvironmentState we do not allow [SchoolArea,
HomeZone, QuietZone, SharedSpace]
        for RoadIntersectionFeature we allow [CompactRoundabout,
            TJunction,
            Crossroads,
            LaneSplit,
            LaneMerge,
            Roundabout Entrance]
        for PointRoadFeature we do not allow [EquestrianCrossing,
            TrafficCalming,
            RoadWork,
            LevelCrossing]
local restrictions
    when Roundabout we do not allow [MediumTrafficDensity]
    when Roundabout we do not allow [Pedestrian]
    when TJunction we do not allow [MediumTrafficDensity]
    when LightRain we do not allow [DualCarriageway,Roundabout]
    when LightRain we do not allow [Fifty, Sixty] //Speeds we
cannot drive
```

The "default" setting in the above is a specific mechanism for parts of ontology not explicitly defined, where any element of the ontology that is not explicitly mentioned will form part of the ODD. Another option is restrictive, where any element of the ontology that is not explicitly falls outside of the ODD.

An intuitive syntax is provided for defining elements in relation to single dimensions and attributes.

Fine-grained control of the ODD is provided via "local restrictions". Some explanation of certain local restrictions defined in the above ODD code follows.

A first local restriction is as follows:
when Roundabout we do not allow [MediumTrafficDensity]

This local restriction excludes roundabouts with medium traffic density from the ODD; with the earlier global definition that restricts traffic density to light and medium, i.e.
for GenericTrafficDensity we allow [LowTrafficDensity, MediumTrafficDensity]
the combined effect is that only roundabouts with low traffic density are within the defined ODD.

A second local restriction is:
when Roundabout we do not allow [Pedestrian]

Roundabouts at which one or more pedestrians are present therefore fall outside of the ODD.

A "vehicle" herein is understood to mean any transportation machine (cars, motorcycles, aeroplanes, watercraft, hovercraft etc.) Whilst the level 3/level 4 criteria typically apply to road vehicles, the present techniques can be applied to any automated vehicles to which ODD-based response rules are applicable.

A computer system comprises execution hardware which may be configured to execute the method/algorithmic steps disclosed herein and/or to implement a model trained using the present techniques. The term execution hardware encompasses any form/combination of hardware configured to execute the relevant method/algorithmic steps. The execution hardware may take the form of one or more processors, which may be programmable or non-programmable, or a combination of programmable and non-programmable hardware may be used. Examples of suitable programmable processors include general purpose processors based on an instruction set architecture, such as CPUs, GPUs/accelerator processors etc. Such general-purpose processors typically execute computer readable instructions held in memory coupled to the processor and carry out the relevant steps in accordance with those instructions. Other forms of programmable processors include field programmable gate arrays (FPGAs) having a circuit configuration programmable though circuit description code. Examples of non-programmable processors include application specific integrated circuits (ASICs). Code, instructions etc. may be stored as appropriate on transitory or non-transitory media (examples of the latter including solid state, magnetic and optical storage device(s) and the like).

The invention claimed is:

1. A computer system for testing performance of a stack for planning ego vehicle trajectories in real or simulated driving scenarios, the computer system comprising memory and one or more processors configured to:
receive (i) scenario ground truth and (ii) internal state data of the stack, the scenario ground truth and internal state data generated using the stack to control an ego agent responsive to at least one other agent in the simulated driving scenario;
receive a defined operational design domain (ODD);
apply one or more driving rules to the scenario ground truth for evaluating the performance of the stack in the scenario, and provide an output for each of the driving rules indicating whether that driving rule has been complied with;
wherein the one or more driving rules include at least one ODD-based response rule, and
wherein the one or more processors are further configured to apply the ODD-based response rule by performing operations including:
processing the scenario ground truth over multiple time steps, to determine whether or not the scenario is within the defined ODD at each time step, and thereby detecting a change in the scenario that takes the scenario outside of the defined ODD, and
processing the internal state data, to determine whether a required state change occurred within the stack within a required time interval, the output for the at least one ODD-based response rule indicating whether or not the required state change occurred within the required time interval.

2. The computer system of claim 1, wherein the ODD is defined in an ODD specification and the one or more processors are further configured to implement a rule editor configured to interpret the ODD specification, in order to implement the defined ODD.

3. The computer system of claim 2, wherein the rule editor is configured to interpret the ODD specification according to a formal ontology language.

4. The computer system of claim 2, wherein the stack is configured to make an online determination as to whether or not it is operating within the defined ODD, based on the ODD specification, the internal state data of the stack being dependent thereon.

5. The computer system of claim 1, wherein the ODD is encoded as a computational graph of atomic operators and numerical thresholds, wherein the is one or more processors are configured to determine whether the scenario is within the ODD by evaluating the computational graph at each time step.

6. The computer system of claim 5, wherein the ODD is defined in an ODD specification and the one or more processors are further configured to implement a rule editor configured to interpret the ODD specification, in order to implement the defined ODD, wherein the rule editor is further configured to construct the computational graph according to the ODD specification.

7. The computer system of claim 6, wherein the rule editor is further configured to receive a modified ODD specification, modify a first subset of the computational graph to implement the modified ODD specification, without modifying a second subset of the computational graph common to the ODD specification and the modified ODD specification;
wherein the one or more processors are further configured to apply the ODD-based response rule for:
the ODD specification, by evaluating the first and second subsets of the computational graph, and
the modified ODD specification, by evaluating the modified first subset of the computational graph, without re-evaluating the second subset of the computational graph.

8. The computer system of claim 7, wherein the rule editor is further configured to interpret the ODD specification based on an ontology that maps ODD concepts to corresponding numerical variable ranges of the scenario, by:
identifying ODD concepts in the ODD specification,
determining, from the ontology, corresponding numerical ranges, and
setting the thresholds of the computational graph to implement the corresponding numerical ranges.

9. The computer system of claim 8, wherein the rule editor is further configured to modify the first subset of the computational graph by:
detecting a modified ODD concept in the modified ODD specification,
determining, from the ontology, a numerical range corresponding to the modified ODD concept, and modifying at least one of the thresholds of the computational graph to implement the numerical range corresponding to the modified ODD concept.

10. The computer system of claim 5, wherein the ODD is defined in an ODD specification and the one or more processors are further configured to implement a rule editor configured to interpret the ODD specification, in order to implement the defined ODD;
    wherein the rule editor is configured to receive a modified ODD specification, and apply the ODD-based response rule for:
        the ODD specification, by evaluating first and second subsets of the computational graph, and
        the modified ODD specification, by re-evaluating the first subset of the computational graph, without re-evaluating the second subset of the computational graph, the second subset of the computational graph unaffected by a modification of the modified ODD specification, the first subset of the computational graph including at least one node modified based on the modified ODD specification.

11. The computer system of claim 1, wherein the at least one ODD-based response rule comprises a transition demand rule, and the one or more processors are further configured to evaluate the transition demand rule by processing the internal state data to determine whether or not a transition demand occurred within a required transition demand interval of the change in the scenario.

12. The computer system of claim 1, wherein the at least one ODD-based response rule comprises a minimum risk maneuver (MRM) rule, and the one or more processors are further configured to evaluate the MRM rule by processing the internal state data to determine whether or not a minimum risk maneuver was instigated within a required MRM interval.

13. The computer system of claim 12, wherein the at least one ODD-based response rule comprises a transition demand rule, and the one or more processors are further configured to evaluate the transition demand rule by processing the internal state data to determine whether or not a transition demand occurred within a required transition demand interval of the change in the scenario, wherein the required MRM interval is measured from the transition demand.

14. The computer system of claim 1, wherein the driving rules additionally include one or more trajectory evaluation rules, and the one or more processors are further configured to apply the trajectory evaluation rules, independently of the internal state data, based on a realized trajectory of the ego agent in the scenario.

15. The computer system of claim 14, wherein the trajectory evaluation rules pertain to safety, progress, comfort or any combination thereof.

16. The computer system of claim 14, wherein the at least one ODD-based response rule comprises a minimum risk maneuver (MRM) rule, wherein the one or more processors are further configured to evaluate the MRM rule by processing the internal state data to determine whether or not a minimum risk maneuver was instigated within a required MRM interval, wherein the output for the MRM rule indicates whether or not the minimum risk maneuver was instigated within the stack within the required MRM interval, and, in an event the minimum risk maneuver is instigated, one or more outputs of the trajectory evaluation rules pertain to a portion of the realized trajectory caused by the instigation of the minimum risk maneuver.

17. The computer system of claim 1, wherein the ODD-based response rule is encoded in temporal logic.

18. A non-transitory computer-readable storage medium storing computer-readable instructions for testing performance of a stack for planning ego vehicle trajectories in real or simulated driving scenarios, the computer-readable instructions configured, when executed on one or more processors, to cause the one or more processors to implement:
    a test oracle configured to apply one or more driving rules to scenario ground truth for evaluating the performance of the stack in the scenario, and provide an output for each of one or more driving rules indicating whether each driving rule has been complied with;
    wherein the one or more driving rules include at least one ODD-based response rule, the test oracle further configured to apply the ODD-based response rule by performing operations including:
        processing the scenario ground truth over multiple time steps, to determine whether or not the scenario is within a defined operational design domain (ODD) at each time step, and thereby detecting a change in the scenario that takes the scenario outside of the defined ODD, and
        processing internal state data of the stack, to determine whether a required state change occurred within the stack, within a required time interval, the output for the at least one ODD-based response rule indicating whether or not the required state change occurred within the required time interval.

19. The non-transitory computer-readable storage medium according to claim 18, wherein the ODD is defined in an ODD specification, the computer-readable instructions further configured, when executed on the one or more processors, to cause the one or more processors to implement a rule editor configured to interpret the ODD specification, in order to implement the defined ODD in the test oracle.

20. A computer-implemented method of testing performance of a stack for planning ego vehicle trajectories in real or simulated driving scenarios, the method comprising:
    receiving (i) scenario ground truth and (ii) internal state data of the stack, the scenario ground truth and internal state data generated using the stack to control an ego agent responsive to at least one other agent in the simulated driving scenario;
    receiving a driving specification;
    applying one or more driving rules to the scenario ground truth for evaluating the performance of the stack in the scenario, and providing an output for each of the driving rules indicating whether that driving rule has been complied with, wherein the one or more driving rules include at least one specification-based response rule,
    wherein applying the specification-based response rule, includes, by a test oracle:
        processing the scenario ground truth over multiple time steps, and thereby detecting a change in the scenario that requires a response in a form of a required state change within the stack, and
        processing the internal state data, to determine whether the required state change occurred within the stack, within a required time interval, the output for the at least one specification-based response rule indicating whether or not the required state change occurred within the required time interval.

\* \* \* \* \*